US011892782B2

(12) United States Patent
Anzai et al.

(10) Patent No.: US 11,892,782 B2
(45) Date of Patent: Feb. 6, 2024

(54) POWDER ACCOMMODATING CONTAINER, POWDER SUPPLY DEVICE, DEVELOPING DEVICE, AND IMAGE FORMING APPARATUS

(71) Applicant: FUJIFILM Business Innovation Corp., Tokyo (JP)

(72) Inventors: Takashi Anzai, Kanagawa (JP); Takafumi Wakai, Kanagawa (JP); Takashi Akaike, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/893,163

(22) Filed: Aug. 22, 2022

(65) Prior Publication Data

US 2023/0314984 A1 Oct. 5, 2023

(30) Foreign Application Priority Data

Mar. 29, 2022 (JP) ................................ 2022-052971

(51) Int. Cl.
*G03G 15/08* (2006.01)
*G03G 21/16* (2006.01)

(52) U.S. Cl.
CPC ..... *G03G 15/0882* (2013.01); *G03G 15/0868* (2013.01); *G03G 21/1676* (2013.01); *G03G 2215/0687* (2013.01)

(58) Field of Classification Search
CPC ........... G03G 15/0868; G03G 15/0882; G03G 21/1676; G03G 2215/0687; G03G 2215/088
See application file for complete search history.

(56) References Cited

U.S. PATENT DOCUMENTS

| | | | | |
|---|---|---|---|---|
| 8,369,736 B2 | 2/2013 | Takashima et al. | | |
| 10,866,536 B2 | 12/2020 | Kuwata et al. | | |
| 2014/0169827 A1* | 6/2014 | Hattori | G03G 15/0882 | 399/106 |
| 2014/0199096 A1* | 7/2014 | Yoshida | G03G 15/0868 | 399/258 |
| 2014/0363196 A1* | 12/2014 | Wada | G03G 21/1676 | 399/106 |
| 2017/0285527 A1* | 10/2017 | Okabe | G03G 15/0889 | |

FOREIGN PATENT DOCUMENTS

| | | |
|---|---|---|
| JP | 2011107644 | 6/2011 |
| JP | 2020052198 | 4/2020 |

* cited by examiner

*Primary Examiner* — Sophia S Chen
(74) *Attorney, Agent, or Firm* — JCIPRNET

(57) ABSTRACT

A powder accommodating container includes a powder accommodating portion that accommodates powder, a sealing section that openably seals a supply port by being removed from the powder accommodating portion, and a breaking section that has a film-shaped member that breaks the powder in the powder accommodating portion by being removed from the powder accommodating portion in a case of opening the supply port, is fixed to plural places in the powder accommodating portion such that the film-shaped member is removable, and is fixed to the powder accommodating portion such that a force required for removing a tip of the film-shaped member from the powder accommodating portion is larger than other portions.

20 Claims, 18 Drawing Sheets

POWDER ACCOMMODATING CONTAINER, POWDER SUPPLY DEVICE, DEVELOPING DEVICE, AND IMAGE FORMING APPARATUS

CROSS-REFERENCE TO RELATED APPLICATIONS

This application is based on and claims priority under 35 USC 119 from Japanese Patent Application No. 2022-052971 filed Mar. 29, 2022.

BACKGROUND

(i) Technical Field

The present invention relates to a powder accommodating container, a powder supply device, a developing device, and an image forming apparatus.

(ii) Related Art

In the related art, for example, an apparatus disclosed in JP2011-107644A has already been proposed as a technique related to a powder accommodating container.

JP2011-107644A discloses the apparatus configured to include a breaking member having a breaking portion that is arranged along one side surface and the other side surface of a dividing portion, which is arranged in a developer accommodating portion and divides the developer accommodating portion, and a pulling portion that extends from a breaking and pulling port, which is connected to the breaking portion and is formed at the developer accommodating portion, to an outside of the developer accommodating portion, in which the breaking portion moves in a direction intersecting the one side surface and the other side surface of the dividing portion and breaks a developer in the developer accommodating portion in a case where the pulling portion is pulled.

SUMMARY

Aspects of non-limiting embodiments of the present disclosure relate to a powder accommodating container, a powder supply device, a developing device, and an image forming apparatus that reliably break powder regardless of a structure a powder accommodating portion compared to a case of not including a breaking section that has a film-shaped member breaking the powder in the powder accommodating portion by being removed from the powder accommodating portion together with a sealing section in a case of opening a supply port and in which a tip of the film-shaped member is temporarily fixed to an end portion on an opposite side to a removal direction of the sealing section.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a powder accommodating container including a powder accommodating portion that accommodates powder, a sealing section that openably seals a supply port by being removed from the powder accommodating portion, and a breaking section that has a film-shaped member that breaks the powder in the powder accommodating portion by being removed from the powder accommodating portion in a case of opening the supply port, is fixed to a plurality of places in the powder accommodating portion such that the film-shaped member is removable, and is fixed to the powder accommodating portion such that a force required for removing a tip of the film-shaped member from the powder accommodating portion is larger than other portions.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings.

Exemplary Embodiment 1

Figure 1:
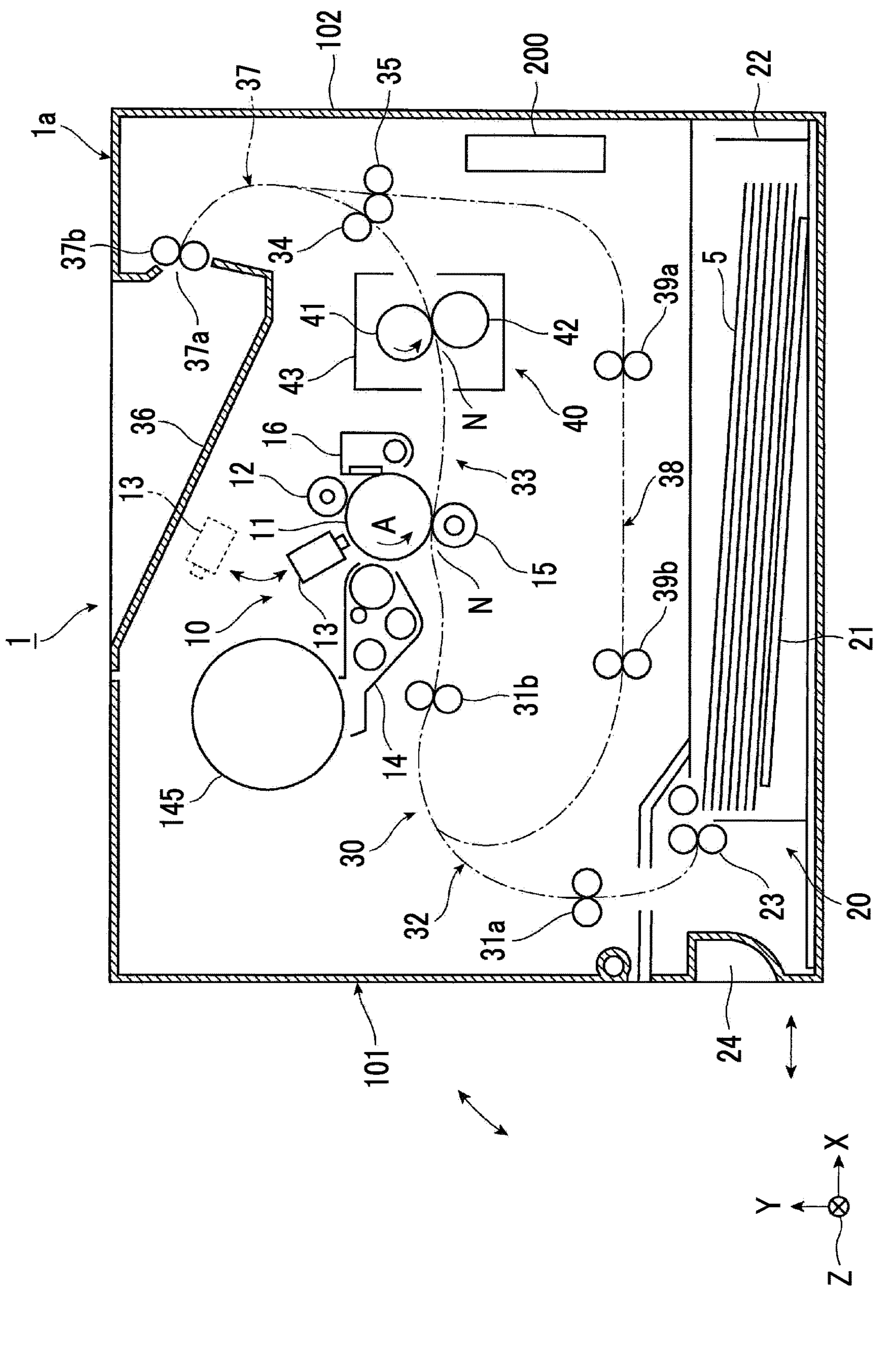
FIG. 1 is an overall configuration view showing an image forming apparatus according to exemplary embodiment 1 of the invention.
Figure 2:
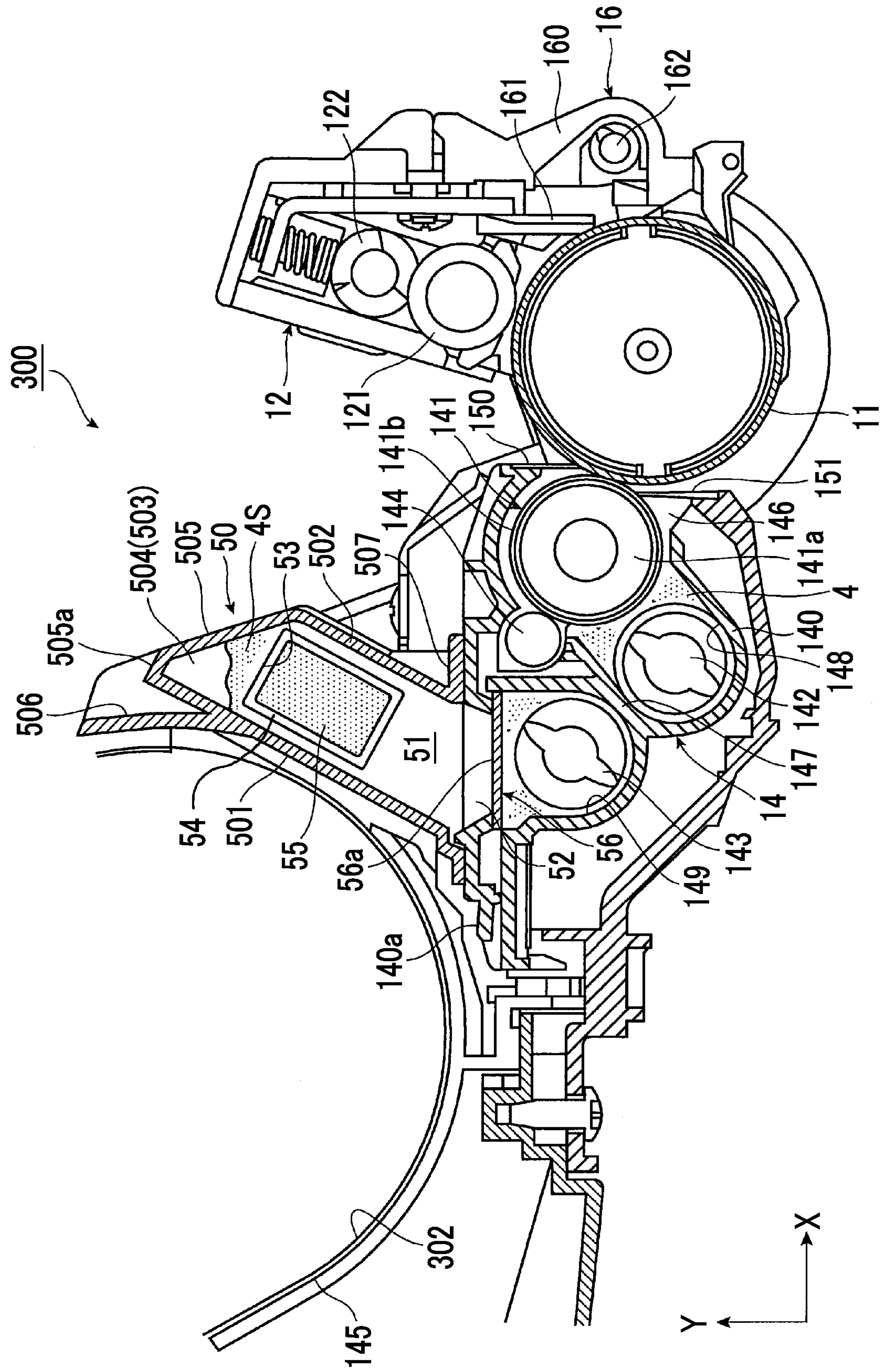
FIG. 2 is a cross-sectional configuration view showing a process cartridge of the image forming apparatus according to exemplary embodiment 1 of the invention.

FIGS. 1 and 2 show an image forming apparatus to which a powder accommodating container and a developing device according to exemplary embodiment 1 are applied. FIG. 1 shows an overall outline of the image forming apparatus, and FIG. 2 shows an enlarged major portion (image forming unit) of the image forming apparatus. In the drawings, an arrow X indicates a depth direction along a horizontal direction, Y indicates a vertical direction, and Z indicates a width direction along the horizontal direction, respectively.

Overall Configuration of Image Forming Apparatus

An image forming apparatus 1 according to exemplary embodiment 1 is configured as, for example, a monochrome printer. As shown in FIG. 1, the image forming apparatus 1 includes an apparatus body 1*a* formed in a substantially rectangular parallelepiped shape of which a height along the vertical direction Y is relatively small compared to a length in the depth direction X. The apparatus body 1*a* is provided with a front cover 101 that can be opened and closed on the front (the left in FIG. 1) in a case where an operator (user) operates the image forming apparatus 1. In addition, at an upper end surface of the apparatus body 1*a*, a paper discharge portion 36 to which recording paper 5, which is an example of a recording medium on which an image is formed, is discharged is provided in an inclined state so that an end portion along the depth direction is lowered. The apparatus body 1*a* is configured by an exterior cover 102 including a support structural member and the front cover 101.

The image forming apparatus 1 includes an image forming device 10 that forms a toner image to be developed with a toner configuring a developer, a feeding device 20 that accommodates the required recording paper 5 to be supplied to a transfer position of the image forming device 10 and supplies the recording paper, a transport device 30 that transports the recording paper 5 supplied from the feeding device 20 along a transport path indicated by a one-dot chain line in FIG. 1, and a fixing device 40 that fixes a toner image on the recording paper 5, which is transferred by the image forming device 10.

The image forming device 10 includes a photoreceptor drum 11 that rotates as an example of image forming means (image holding section). Each device, which is an example of the following image forming means, is generally arranged in the vicinity of the photoreceptor drum 11. The major devices include a charging device 12 that charges a circumferential surface (image holding surface) of the photoreceptor drum 11, on which image forming is possible, to a required potential, an exposure device 13 that irradiates the charged circumferential surface of the photoreceptor drum 11 with light based on image information (signal) and forms an electrostatic latent image having a potential difference, a developing device 14 that is an example of a powder transport device (developing section) developing the electrostatic latent image with a toner, which is a black developer, and making a toner image, a transfer device 15 that transfers the toner image to the recording paper 5, and a drum cleaning device 16 that performs cleaning by removing an attached object such as a toner, which remains and is attached to the image holding surface of the photoreceptor drum 11 after transfer.

The photoreceptor drum 11 has the image holding surface formed to have a photoconductive layer (photosensitive layer) that consists of a photosensitive material on a circumferential surface of a cylindrical or columnar base material to be grounded. The photoreceptor drum 11 is supported to rotate in a direction indicated by an arrow A.

As shown in FIG. 2, the charging device 12 includes a contact-type charging roller 121 arranged in a state of being in contact with the photoreceptor drum 11. A cleaning roller 122 that cleans a surface of the charging roller 121 is arranged on a back surface side of the charging roller 121. A charging voltage is supplied to the charging roller 121. As the charging voltage, a voltage or a current having the same polarity as the charging polarity of a toner supplied from the developing device 14 is supplied in a case where the developing device 14 performs reversal development. A non-contact type charging device such as a scorotron arranged in a non-contact state with the surface of the photoreceptor drum 11 may be used as the charging device 12.

The exposure device 13 consists of an LED print head that irradiates the photoreceptor drum 11 with light according to image information with a light emitting diode (LED), which is a plurality of light emitting elements arranged along an axial direction of the photoreceptor drum 11, and that forms an electrostatic latent image. Since attachment and detachment of a process cartridge 300 to be described below are possible, the exposure device 13 is movable to an exposure position close to the photoreceptor drum 11 and a retracted position that is indicated by a broken line in FIG. 2 and is separated away from the circumferential surface of the photoreceptor drum 11, in an interlocking manner with an opening and closing operation of the front cover 101. A device that performs deflection and scanning along the axial direction of the photoreceptor drum 11 with laser light configured according to the image information may be used as the exposure device 13. In a case where the device that performs deflection and scanning with laser light is used as the exposure device 13, it is not necessary to retract the exposure device since exposure is possible from a position separated away from the circumferential surface of the photoreceptor drum 11.

As shown in FIG. 2, the developing device 14 is configured by arranging, inside a casing 140 in which an opening portion and an accommodating chamber for a developer 4 are formed, a developing roller 141 that is an example of developer holding means for holding the developer 4, which is an example of powder, and transporting the developer to a developing region facing the photoreceptor drum 11, an agitating and supplying member 142 and an agitating and transporting member 143 that consist of two screw augers which transport the developer 4 to pass through the developing roller 141 while agitating the developer, and a layer thickness regulating member 144 that regulates the amount (layer thickness) of the developer 4 held by the developing roller 141. A developing bias voltage is supplied from a power supply device (not shown) to the developing device 14 between the developing roller 141 and the photoreceptor drum 11. A two-component developer containing a non-magnetic toner and a magnetic carrier is used as the developer 4. The developing device 14 which is an example of the powder supply device will be described in detail later.

As shown in FIG. 1, the transfer device 15 is a contact-type transfer device including a transfer roller, which is in contact with and rotates in the vicinity of the photoreceptor drum 11 via the recording paper 5 and to which a transfer voltage is supplied in a case of image formation. As the transfer voltage, a direct current voltage indicating a polarity opposite to the charging polarity of a toner is supplied from the power supply device (not shown).

As shown in FIG. 2, the drum cleaning device 16 is configured by a container-shaped body 160 having a part opened, a cleaning plate 161 that is arranged to be in contact with the circumferential surface of the photoreceptor drum 11 after primary transfer at a required pressure and performs cleaning by removing an attached object such as a remaining toner, and a sending member 162 such as a screw auger that collects and transports the attached object such as the toner removed by the cleaning plate 161 so as to be sent out to a collection system (not shown). A plate-shaped member (for example, a blade) that consists of a material such as rubber is used as the cleaning plate 161.

As shown in FIG. 1, the fixing device 40 is configured by arranging, inside a device housing 43 in which an introduction port and a discharge port for the recording paper 5 are formed, a heating rotating body 41 in a roller form or a belt form that rotates in a direction indicated by an arrow and is heated by heating means such that a surface temperature is maintained at a predetermined temperature and a pressurizing rotating body 42 in a belt form or a roller form that rotates while being in contact at a predetermined pressure in a state of almost following an axial direction of the heating rotating body 41. In the fixing device 40, a contact portion where the heating rotating body 41 and the pressurizing rotating body 42 are in contact with each other is a fixing processing portion (nip portion) N in which required fixing processing (heating and pressurization) is performed.

The feeding device 20 is arranged at a bottom portion of the apparatus body 1*a* at a position below the image forming device 10 along the vertical direction Y. The feeding device 20 is generally configured by a single (or plurality of) paper accommodating body 22 that accommodates the recording paper 5 of an appropriate size and type in a stacked state on a stacking plate 21 and a sending device 23 that sends out the recording paper 5 one by one from the paper accommodating body 22. The feeding device 20 is attachable and detachable with respect to the apparatus body 1*a* of the image forming apparatus 1 by holding and pulling out a grip portion 24 provided in front of the paper accommodating body 22 with a hand.

Examples of the recording paper 5 include thin paper, such as plain paper and tracing paper used in an electrophotographic copying machine or a printer, or an OHP sheet. In order to further improve smoothness of an image surface after fixing, for example, it is preferable that the surface of the recording paper 5 is also as smooth as possible, and for example, a so-called thick paper having a large basis weight, such as coated paper obtained by coating the surface of plain paper with a resin and printing art paper, can also be used.

Between the feeding device 20 and the transfer device 15, a feeding and transporting path 32 configured by a plurality of (or a single) pairs of paper transport rollers 31*a* and 31*b* that transport the recording paper 5 sent out from the feeding device 20 to the transfer position or a transport guide (not shown) is provided in a shape facing upward along the vertical direction Y at the front of the apparatus body 1*a* and curving from the middle toward the horizontal direction X inside the apparatus body 1*a*. The pair of paper transport rollers 31*b* arranged at a position immediately before the transfer position in the feeding and transporting path 32 is configured as, for example, rollers (registration rollers) that adjust a transport timing of the recording paper 5. In addition, a paper transport path 33 for transporting the recording paper 5 after transfer, which is sent out from the transfer device 15, to the fixing device 40 is provided from the transfer device 15 to the fixing device 40 along the horizontal direction X.

In addition, a discharging and transporting path 37 for transporting and discharging the recording paper to the paper discharge portion 36 via one pair of transporting rollers 34 among two pairs of transporting rollers 34 and 35, in which one transport roller is commonly configured, is provided diagonally above the fixing device 40. The paper discharge portion 36 is provided in a state where a downstream side along a discharge direction is inclined to be positioned above at the upper end surface of the apparatus body 1*a*.

A pair of discharge rollers 37*b* that discharge the recording paper 5 and reverse the front and back are arranged at an outlet 37*a* of the discharging and transporting path 37. The pair of discharge rollers 37*b* can switch a rotation direction thereof between a forward rotation direction and a reverse rotation direction.

In addition, a switching gate (not shown) that switches a transport direction of the recording paper 5 is provided in front of the pair of discharge rollers 37*b*. In a case of forming an image on both surfaces of the recording paper 5, the transport direction of the recording paper 5 is switched by the switching gate (not shown) from the discharging and transporting path 37 to a two-sided transport path 38. In this case, after a trailing end of the recording paper 5 transported in the discharge direction passes through the switching gate (not shown), the pair of discharge rollers 37*b* switch the rotation direction from the forward rotation direction (discharge direction) to the reverse rotation direction. The transport path of the recording paper 5 transported by the pair of discharge rollers 37*b* in the reverse rotation direction is switched to the vertical direction Y by the switching gate (not shown), and the recording paper is transported to the two-sided transport path 38 formed to be curved from the vertical direction Y to the horizontal direction X along a back surface of the apparatus body 1*a* of the image forming apparatus 1 via the pair of transporting rollers 35. The two-sided transport path 38 includes the pairs of paper transport rollers 39*a* and 39*b* that transport the recording paper 5 in a state where the front and back are reversed to the pair of paper transport rollers 31*b* and the transport guide (not shown).

As shown in FIG. 2, a toner cartridge 145 that accommodates a developer containing at least a toner to be supplied to the developing device 14 is arranged above the developing device 14. A toner supply device including a supply roller (not shown) that supplies the toner accommodated in the toner cartridge 145 to the developing device 14 is provided below the toner cartridge 145.

In addition, the reference sign 200 in FIG. 1 indicates a control device that comprehensively controls an operation of the image forming apparatus 1. A control device 200 includes a central processing unit (CPU), a read only memory (ROM), a random access memory (RAM) (not shown), a bus that connects the CPU and ROM to each other, and a communication interface.

Process Cartridge

Figure 3:
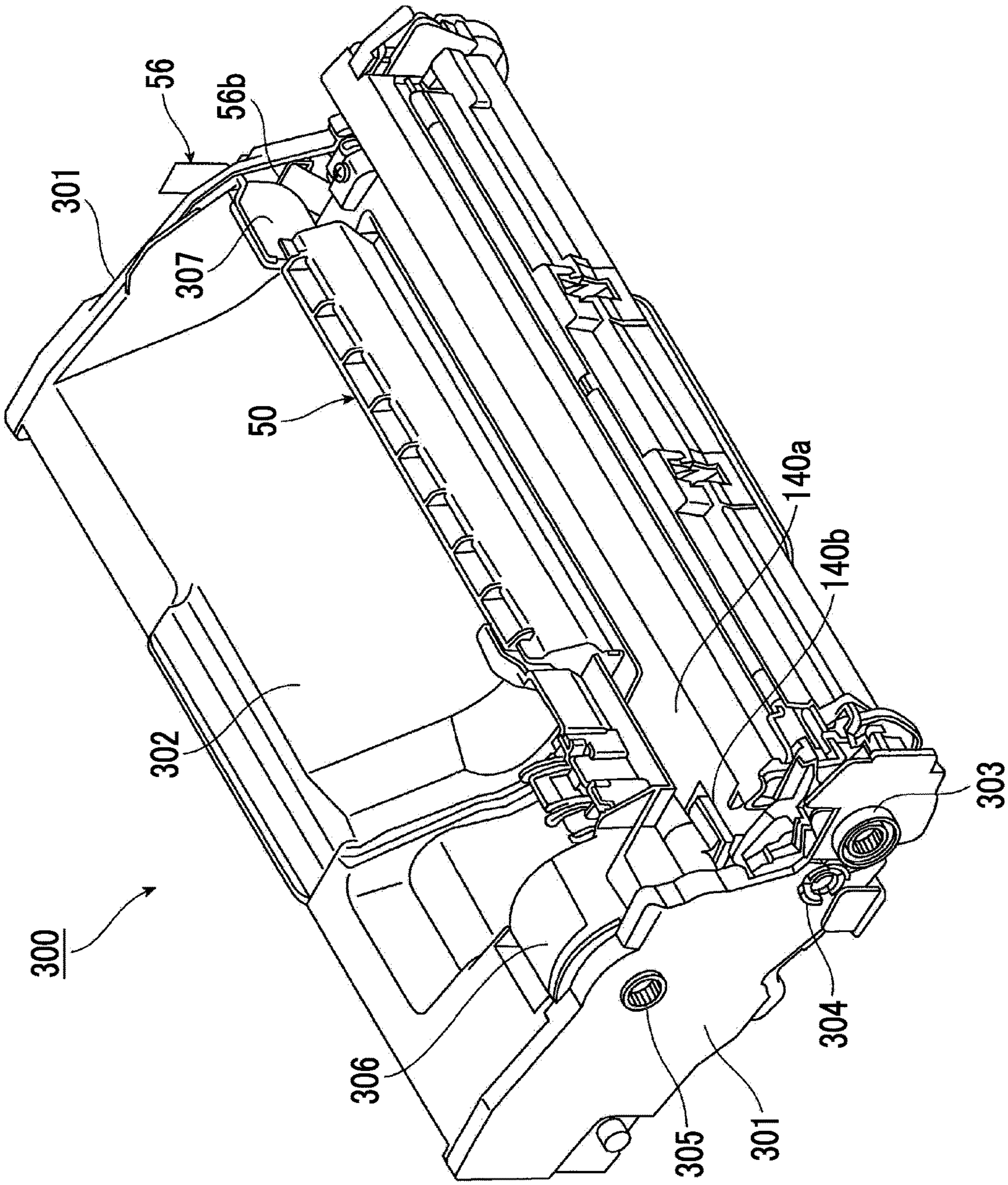
FIG. 3 is a perspective configuration view showing the process cartridge.
Figure 4:
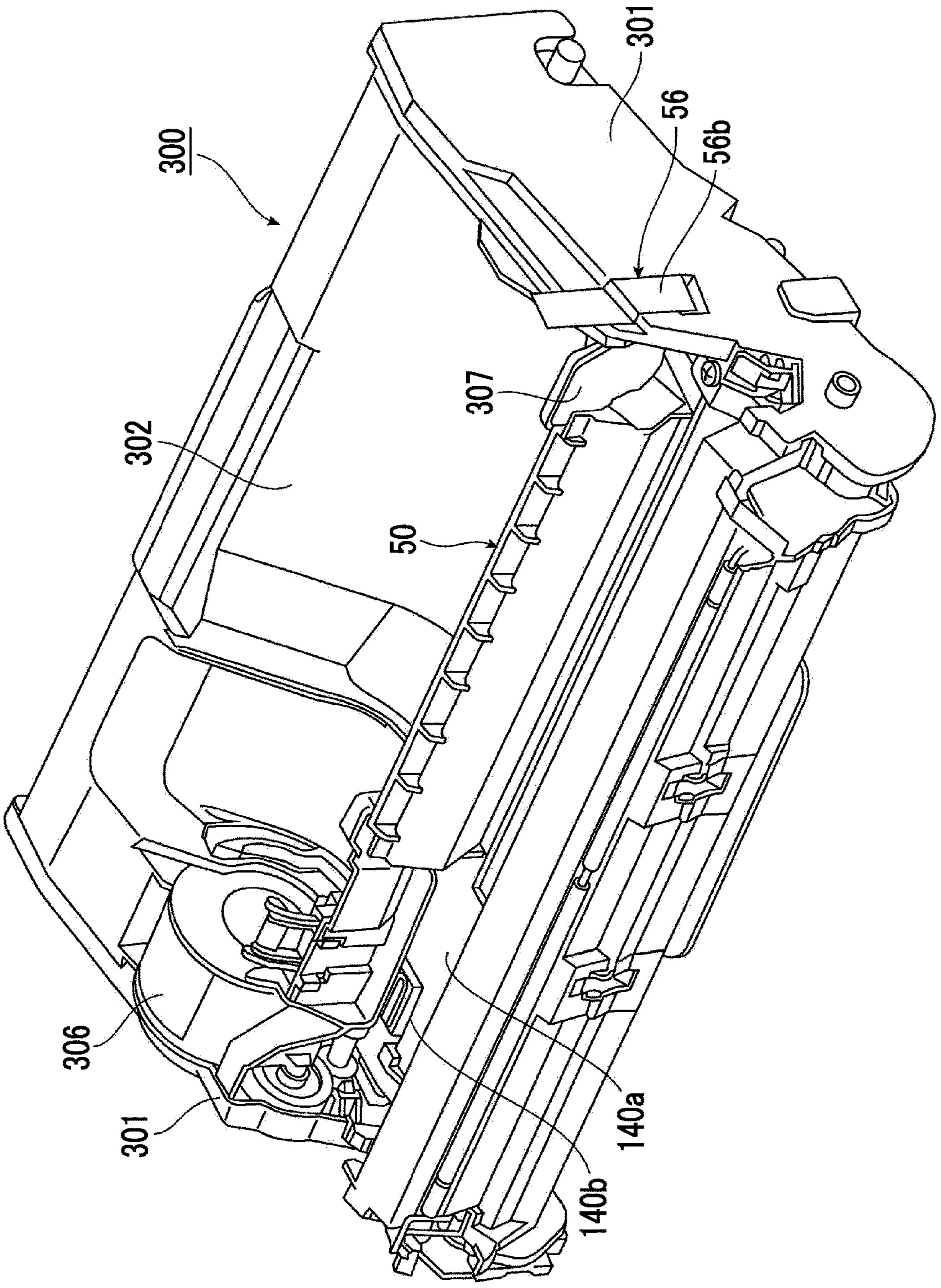
FIG. 4 is a perspective configuration view showing the process cartridge.

In exemplary embodiment 1, as shown in FIG. 2, the image forming device 10 excluding the exposure device 13 and the transfer device 15 is integrally assembled, and the process cartridge 300 which is an example of the image forming unit attachable and detachable with respect to the apparatus body 1*a* of the image forming apparatus 1 is configured. As shown in FIGS. 2 to 4, the process cartridge 300 includes the photoreceptor drum 11, the charging device 12, the developing device 14, and a cartridge body 301 on which the drum cleaning device 16 is integrally mounted. A concave accommodating portion 302 that independently accommodates the toner cartridge 145 to be attachable and detachable is provided on one side of the cartridge body 301. In addition, as shown in FIG. 3, a photoreceptor connecting member 303, a developing device connecting member 304, and a toner supplying and connecting member 305 which are connected to a drive device (not shown) on an apparatus body 1*a* side and to which a drive force is transmitted from the drive device are provided on one side surface (a left side surface in FIG. 3) of the cartridge body 301 in a state of protruding or being exposed toward the side. The cartridge body 301 is provided with a supply unit 306 that supplies a developer from the toner cartridge 145 to the developing device 14 by obtaining the drive force from the toner supplying and connecting member 305 and rotationally driving the toner cartridge 145 and a supply unit 307 that rotatably supports an end portion of the toner cartridge 145 in a longitudinal direction. By mounting the process cartridge 300 at a predetermined position from diagonally above the apparatus body 1*a* of the image forming apparatus 1 in a state where the front cover 101 is opened, the drive force is transmitted via the photoreceptor connecting member 303, the developing device connecting member 304, and the toner supplying and connecting member 305, and a predetermined voltage or current is supplied via a power supplying device (not shown).

Basic Operation of Image Forming Apparatus

Hereinafter, a basic image forming operation by the image forming apparatus 1 will be described.

The image forming apparatus 1 is controlled by the control device 200, and in a case where the image forming apparatus receives command information request for a monochrome image forming operation (printing) from an operation panel (not shown) mounted on the apparatus body 1*a*, a user interface, or a printer driver (not shown), starts the image forming device 10, the feeding device 20, the transport device 30, and the fixing device 40.

As shown in FIGS. 1 and 2, in the image forming device 10, first, the photoreceptor drum 11 rotates in the direction indicated by the arrow A, the charging device 12 charges the surface of the photoreceptor drum 11 to a required polarity (a negative polarity in exemplary embodiment 1) and a required potential. Next, the exposure device 13 irradiates the surface of the photoreceptor drum 11 after charging with light emitted based on image information input to the image forming apparatus 1, and an electrostatic latent image configured at a required potential difference is formed on the surface.

Next, the developing device 14 performs development of the electrostatic latent image formed on the photoreceptor drum 11 by each supplying a black toner charged to the required polarity (negative polarity) from the developing roller 141 and electrostatically attaching the toner. Due to the development, the electrostatic latent image formed on the photoreceptor drum 11 is visualized as a toner image developed with the black toner. The toner is supplied from the toner cartridge 145 to the developing device 14 of the process cartridge 300 via the toner supply device (not shown) at a required timing.

Next, in a case where the toner image formed on the photoreceptor drum 11 is transported to the transfer position, the transfer device 15 transfers the toner image to the recording paper 5.

In addition, in the image forming device 10 that has ended the transfer, the drum cleaning device 16 cleans the surface of the photoreceptor drum 11 by scraping off and removing an attached object. Accordingly, the image forming device 10 is brought into a state where the next image formation operation can be performed.

The feeding device 20 sends out the required recording paper 5 to the feeding and transporting path 32 in accordance with the image formation operation. In the feeding and transporting path 32, the pair of paper transport rollers 31*b*, which are registration rollers, send out and supply the recording paper 5 to the transfer position in accordance with a transfer timing.

Next, the recording paper 5 to which the toner image is transferred is transported to the fixing device 40 via the paper transport path 33. The fixing device 40 performs necessary fixing processing (heating and pressurization) and fixes an unfixed toner image to the recording paper 5 by causing the recording paper 5 after the transfer to be introduced into and to pass through the fixing processing portion N between the heating rotating body 41 and the pressurizing rotating body 42, which are rotating. In a case of an image forming operation of forming an image to one surface only, the recording paper 5 after fixing has ended is discharged to the paper discharge portion 36 provided at the end portion of the apparatus body 1*a* along the discharging and transporting path 37 by the pair of discharge rollers 37*b*.

In addition, in a case of forming an image on both surfaces of the recording paper 5, the recording paper 5 having one surface on which an image is formed is transported to the pair of discharge rollers 37*b* by the switching gate (not shown), and the recording paper 5 is temporarily transported in the discharge direction by the pair of discharge rollers 37*b*. After then, the rotation direction of the pair of discharge rollers 37*b* is reversed in a state where the trailing end of the recording paper 5 is nipped between the pair of discharge rollers 37*b*, the recording paper 5 is transported to the transfer device 15 again via the two-sided transport path 38 after the front and back of the recording paper are reversed, and a toner image is transferred to the back surface of the recording paper 5. The recording paper 5 having the back surface to which the toner image is transferred is transported to the fixing device 40 via the paper transport path 33, is subjected to fixing processing (heating and pressurization) by the fixing device 40, and is discharged to the paper discharge portion 36 by the pair of discharge rollers 37*b*.

With the operations described above, the recording paper 5 having one surface or both surfaces on which a monochrome image is formed is output.

Configuration of Powder Accommodating Container and Developing Device

In a case where the image forming apparatus 1 configured as described above is first started to be used, in order to avoid aggregation of the developer 4 in the developing device 14 of the process cartridge 300, the developing device 14 does not accommodate the developer 4 in advance and is in an empty state during shipment. The inside of the developing device 14 may be configured to accommodate only a carrier configuring the developer 4 during shipment.

In addition, the toner cartridge 145 is configured separately from the process cartridge 300, and during the shipment of the image forming apparatus 1, the toner cartridge 145 is not mounted on the process cartridge 300 in order to avoid aggregation of a toner in the process cartridge 300.

In a case where the image forming apparatus 1 is first started to be used in a state of being reached by the user's hand, the developing device 14 includes a developer accommodating container 50 that accommodates a starter developer 4S (an example of powder) at the start of use as shown in FIG. 2 such that starting an image forming operation or test printing is possible without mounting a new toner cartridge 145 on the process cartridge 300. In addition, the developing device 14 configures a developer supply device that transports and supplies the developer 4, which is an example of the powder, to the developing roller 141. The powder accommodating container according to exemplary embodiment 1 is configured by the developer accommodating container 50 and an upper cover 140*a* of the casing 140 on which the developer accommodating container 50 is mounted.

Herein, first, a configuration of the developing device 14 will be described in detail.

As shown in FIG. 2, a developing opening 146 extending along the axial direction of the photoreceptor drum 11 is opened in a part of the casing 140, which is an example of a developing device body of the developing device 14, facing the photoreceptor drum 11. The developing roller 141 which is a developer holding body is arranged at a place facing the developing opening 146 inside the casing 140. The developing roller 141 has a magnet roller 141*a* in which a magnet having a required polarity is magnetized and arranged in a fixed manner at a predetermined position along a circumferential direction and a cylindrical developing sleeve 141*b* that is rotatably arranged on an outer circumference of the magnet roller 141*a*. In addition, inside the casing 140, an agitating and supplying member 142 that supplies the developer 4 to the developing roller 141 while agitating the developer on the back surface side of the developing roller 141 and an agitating and transporting member 143 that transports the developer 4 to the agitating and supplying member 142 while agitating the developer are arranged rotatably.

The agitating and supplying member 142 and the agitating and transporting member 143 consist of so-called screw augers provided with a spiral blade member in the vicinity of a rotation shaft and are configured to deliver the developer 4 at both end portions along the axial direction while transporting the developer 4 in directions (opposite directions) different from each other along the axial direction. The agitating and supplying member 142 and the agitating and transporting member 143 are divided from each other by a dividing wall 147 configuring the casing 140. The agitating and supplying member 142 and the agitating and transporting member 143 are accommodated in developer accommodating portions 148 and 149 consisting of semi-cylindrical recesses, respectively. In addition, the layer thickness regulating member 144 that regulates the layer thickness of the developer 4 supplied and held on the surface of the developing roller 141 is attached diagonally above the back surface side of the developing roller 141. In FIG. 2, the reference signs 150 and 151 indicate seal members that are provided at edges of the developing opening 146 of the casing 140 and close gaps with the photoreceptor drum 11, respectively.

As shown in FIGS. 2 to 4, in the developing device 14 according to exemplary embodiment 1, the developer accommodating container 50 that is an example of the powder accommodating container at an upper end portion of the casing 140 on the back surface side, which accommodates the starter developer 4S in a case where the developing device 14 is started to be used, is assembled in an inclined state diagonally upward along the vertical direction Y along an outer circumferential surface of the toner cartridge 145.

By assembling the developer accommodating container 50 into the casing 140 of the developing device 14, a developer accommodating chamber 51 which is an example of a powder accommodating portion that accommodates the starter developer 4S together with the casing 140 is formed. The developer accommodating chamber 51 has a supply port 52 in a lower end portion along the vertical direction Y. The supply port 52 of the developer accommodating chamber 51 is opened in an elongated rectangular shape in the upper cover 140*a* of the casing 140.

Figure 5:
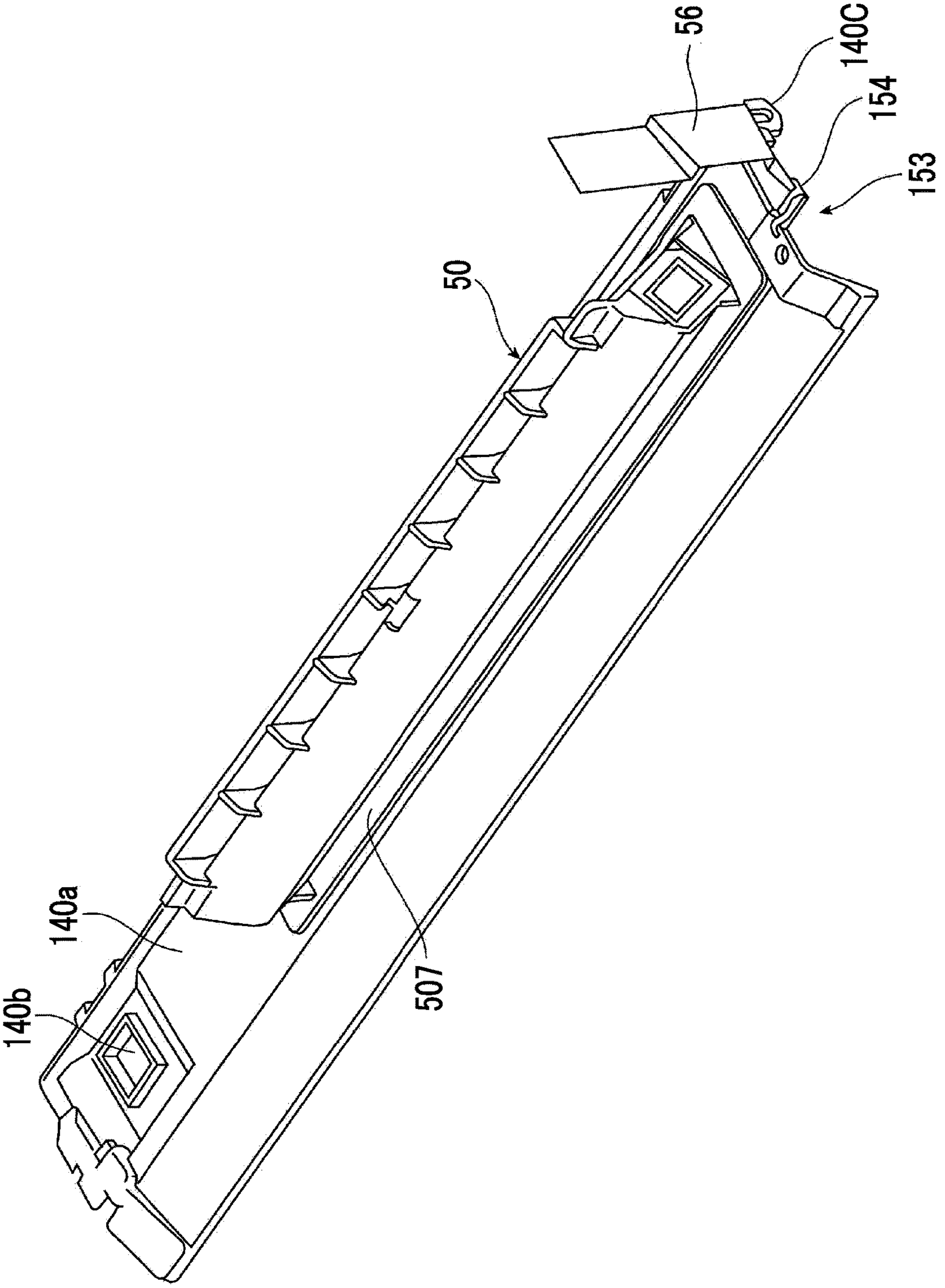
FIG. 5 is a perspective configuration view showing a developer accommodating container.
Figure 6:
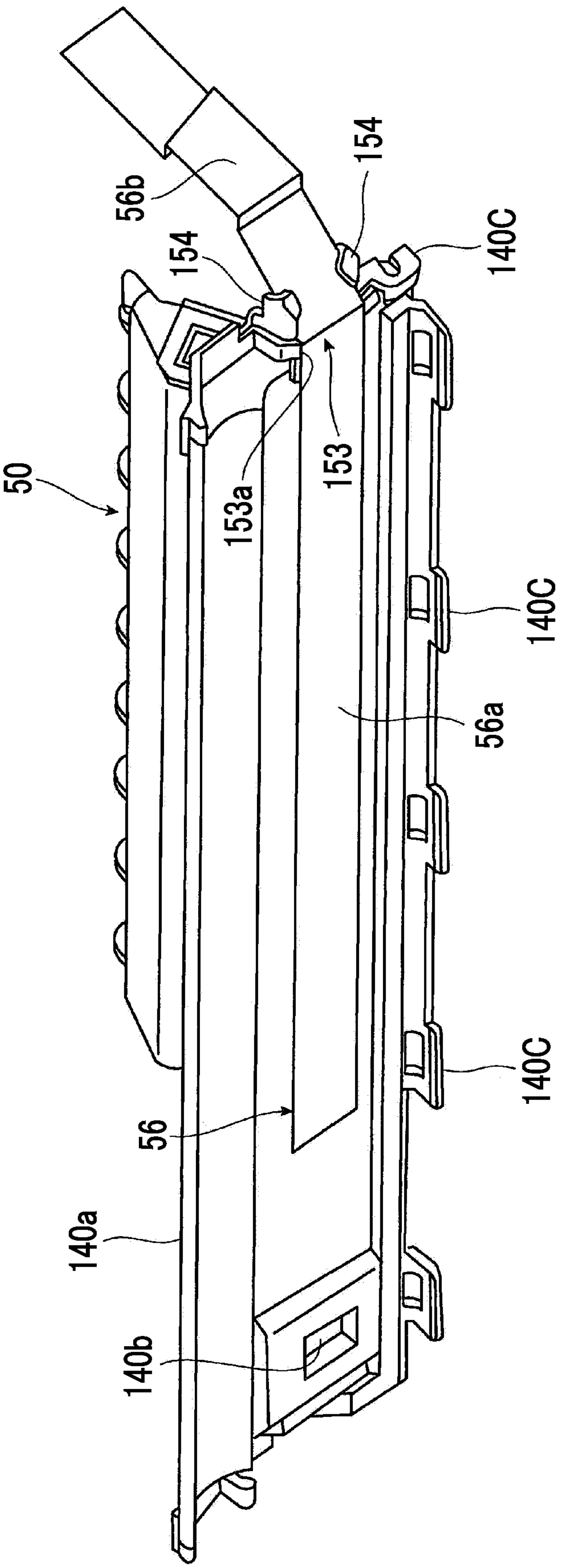
FIG. 6 is a perspective configuration view showing the developer accommodating container.

As shown in FIGS. 5 and 6, the developer accommodating container 50 is formed in an elongated box shape having a substantially trapezoidal cross-section or a rectangular cross-section. The entire bottom surface of the developer accommodating container 50 is open. As shown in FIG. 2, the developer accommodating container 50 is attached to an upper end portion of the upper cover 140*a* of the casing 140 on the back surface side at a corresponding position above the developer accommodating portion 149, in which the agitating and transporting member 143 is arranged, by means such as heat-welding and screwing. The developer accommodating container 50 is arranged on a non-driving side of the casing 140 over a length of substantially two thirds of the casing 140 along the longitudinal direction. The cross-sectional shape or length of the developer accommodating container 50 is set as appropriate according to the amount of the starter developer 4S to be accommodated therein. As shown in FIG. 5, at an end portion of the upper cover 140*a* on a driving side, a replenishing port 140*b* through which a developer containing at least a toner is replenished from the toner cartridge 145 is open.

Figure 8:
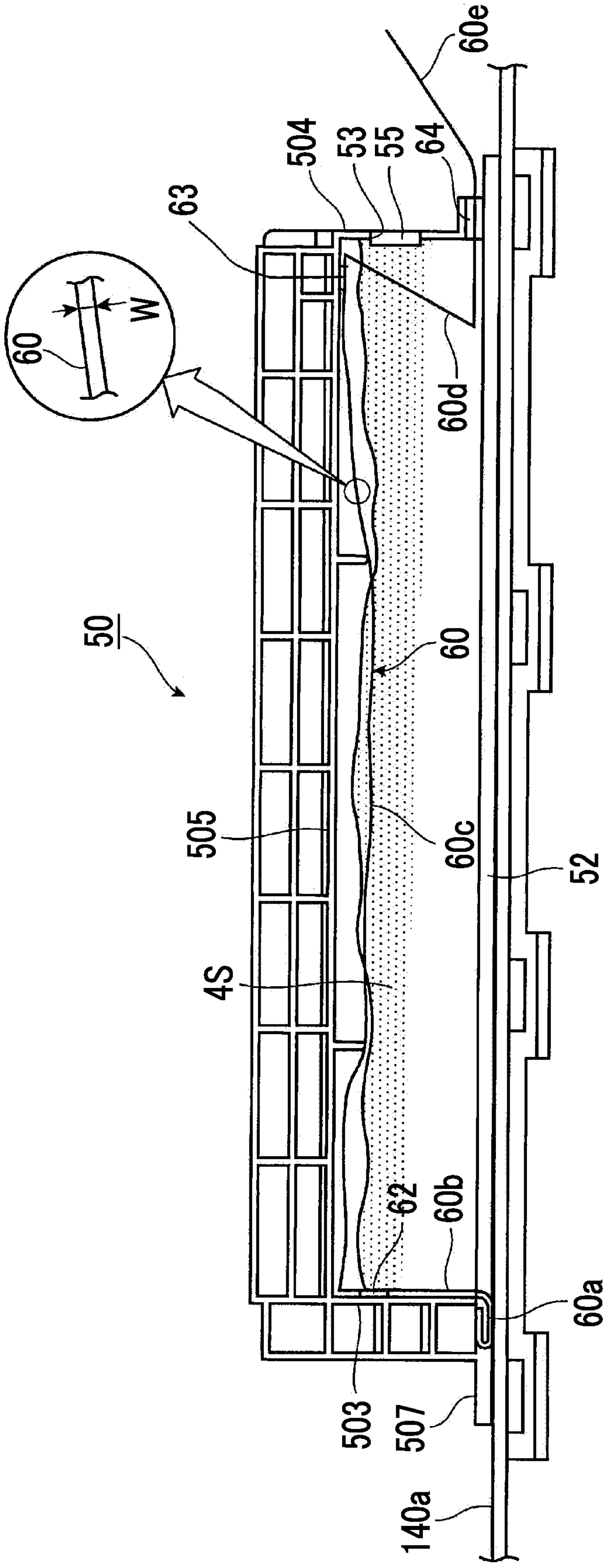
FIG. 8 is a cross-sectional configuration view showing the developer accommodating container.

As shown in FIG. 2, the developer accommodating container 50 includes a left side wall 501 that is positioned on a toner cartridge 145 side and is inclined, a right side wall 502 that is positioned on a photoreceptor drum 11 side and is arranged lower than the left side wall 501 in parallel, front and back walls 503 and 504 that close both end portions of the left side wall 501 and the right side wall 502 along the longitudinal direction, a ceiling wall 505 that is inclined diagonally downward from an upper end portion of the left side wall 501 toward the right side wall 502 via a narrow upper end portion 505*a*, a guide wall 506 that is arranged upward along the vertical direction outside the upper end portion of the left side wall 501 and configures a guide portion of the toner cartridge 145 together with the left side wall 501, and a flange portion 507 that is arranged to extend from lower end portions of the left side wall 501, the right side wall 502, and the front and back walls 503 and 504 toward an outer circumference along the horizontal direction and is formed in a flat rectangular frame shape. The inside of the developer accommodating container 50 configures major portions of the developer accommodating chamber 51 consisting of an elongated accommodating space having a substantially trapezoidal cross-section or a substantially rectangular cross-section. As shown in FIG. 8, the inside of the developer accommodating container 50 is filled with, for example, the starter developer 4S consisting of a toner alone or a toner and a carrier to occupy approximately 70 to 80%. The starter developer 4S may be set to have a carrier concentration higher than the developer 4 used in normal image formation.

As described above FIG. 2, a filling port 53 for filling the inside of the developer accommodating container 50 with the starter developer 4S is open in the back wall 504 of the developer accommodating container 50 after a step of assembling the developing device 14 is ended. The filling port 53 is formed such that a side surface arranged in a diagonally inclined state is in a substantially rectangular shape. In addition, the filling port 53 is sealed with a sealing member 54 consisting of a two-sided tape. A foam 55, which is made of a synthetic resin and is an example of aggregation suppressing means for suppressing the aggregation of the accommodated developer 4, is arranged at an inner surface of the sealing member 54 corresponding to the filling port 53. The foam 55 made of the synthetic resin is formed such that a side surface is a substantially rectangular shape, which is somewhat smaller than an opening area of the filling port

53, and is provided in a state of being bonded to an inner side surface of the sealing member 54 consisting of the two-sided tape. An outer circumferential surface of the filling port 53 is formed in a shape slightly more recessed than an outer side surface of the back wall 504 of the developer accommodating container 50 in order to avoid the sealing member 54 inadvertently coming into contact with other members.

As shown in FIG. 6, the supply port 52 of the developer accommodating chamber 51 is openably sealed with a sealing tape 56 which is an example of a sealing section. The sealing tape 56 is a member that opens the supply port 52 by being removed from the casing 140 of the developing device 14 in a case of first using the process cartridge 300. As shown in FIG. 2, by removing the sealing tape 56, the starter developer 4S accommodated inside the developer accommodating chamber 51 falls due to the weight thereof and is supplied into the developer accommodating portion 149 in an empty state, in which the agitating and transporting member 143 of the casing 140 is accommodated. After then, the starter developer 4S supplied to the developer accommodating portion 149 of the casing 140 is transported along an axial direction of the agitating and transporting member 143 as the process cartridge 300 is mounted on the apparatus body 1*a* of the image forming apparatus 1 and the agitating and transporting member 143 is driven.

The sealing tape 56 is formed of a synthetic resin in an elongated thin film shape having a required width. As shown in FIGS. 4 and 5, the sealing tape 56 has a sealing tape portion 56*a* that is peelably sealed along the supply port 52 in the upper cover 140*a* and a pulling tape portion 56*b* that is obtained by folding back one end portion of the sealing tape portion 56*a* in the longitudinal direction and extends along the sealing tape portion 56*a* to be pulled outward from the sealing tape portion 56*a*. A tip of the sealing tape portion 56*a* of the sealing tape 56 is positioned at an end portion of the supply port 52 on a pulling side, and the supply port 52 is sealed toward an end portion of the supply port 52 on an opposite side to the pulling side. The sealing tape 56 configures the pulling tape portion 56*b* that is folded back again from the end portion of the supply port 52 on the opposite side to the pulling side and extends to the pulling side.

Herein, the sealing tape portion 56*a* of the sealing tape 56 is configured by a tape material to be peelably fixed to an outer circumference edge of the supply port 52 in the upper cover 140*a* through heat-welding, glue, or an adhesive. The sealing tape portion 56*a* and the pulling tape portion 56*b* of the sealing tape 56 may be configured by materials different from each other.

In exemplary embodiment 1, in a state where the sealing tape portion 56*a* of the sealing tape 56 seals the supply port 52 in the upper cover 140*a*, a tip side of the pulling tape portion 56*b* of the sealing tape 56 is arranged to overhang outward from one end of the upper cover 140*a* in the longitudinal direction.

In a case of assembling the developing device 14, the supply port 52 in the upper cover 140*a* is closed by the sealing tape 56 which is the sealing section before accommodating the starter developer 4S. After then, the starter developer 4S fills and is accommodated inside the developer accommodating container 50 from the filling port 53. The filling port 53 is sealed with the sealing member 54.

An appropriate number of attaching claws 140C that elastically deform so as to be caught on top portion opening (not shown) edges of the casing 140 are formed on a circumferential edge of the upper cover 140*a* of the developing device 14, and the upper cover 140*a* is mounted on a top portion opening of the casing 140 of the developing device 14.

Figure 7:
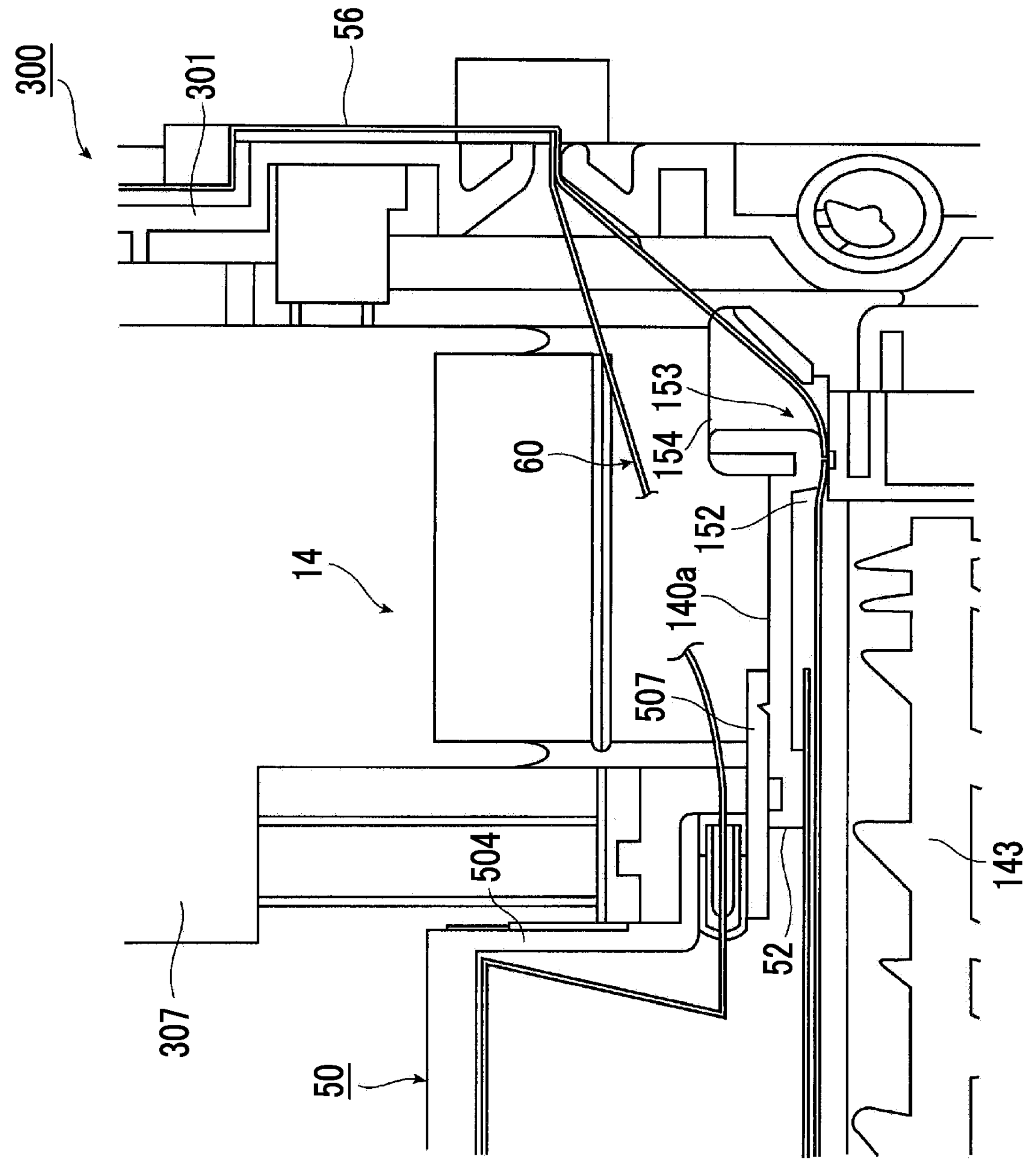
FIG. 7 is a cross-sectional configuration view showing major portions of the process cartridge.

As shown in FIG. 7, a slit-shaped pulling port 152 for pulling out the pulling tape portion 56*b* of the sealing tape 56 is formed in one end portion of the casing 140 of the developing device 14 along the longitudinal direction. In the present example, a fraying mechanism 153 that frays the developer 4 attached to the sealing tape 56 is provided at a place facing the pulling port 152 in the casing 140.

As shown in FIGS. 6 and 7, in the fraying mechanism 153, a regulating wall 153*a* that regulates a position in the width direction intersecting a pulling direction of a pulling tape portion 56*b* of the sealing tape 56 is formed at one end of the upper cover 140*a* in the longitudinal direction with a step slightly larger than the thickness of the sealing tape 56, and the pulling port 152 is secured in a region of the upper cover 140*a* surrounded by the regulating wall 153*a*. In a case where the sealing tape 56 is pulled out from the pulling port 152, the starter developer 4S attached to the sealing tape portion 56*a* of the sealing tape 56 is scraped off. In addition, a holding portion 154 that holds the sealing tape 56 is provided on the outside of the pulling port 152 in the upper cover 140*a*.

As shown in FIGS. 7 and 8, the developing device 14 according to the exemplary embodiment is provided with, inside the developer accommodating container 50, a breaking tape 60 that is an example of a breaking section which has a film-shaped member breaking the starter developer 4S aggregated inside the developer accommodating chamber 51 by being removed from the upper cover 140*a* of the casing 140 together with the sealing tape 56 in a case of opening the supply port 52 and of which a tip of the film-shaped member is temporarily fixed to a portion of the supply port 52 positioned at an end portion on an opposite side to a removal direction of the sealing tape 56.

Herein, the portion of the supply port 52 means a portion corresponding (facing) the supply port 52 and does not necessarily have to be the supply port 52.

Figure 9:
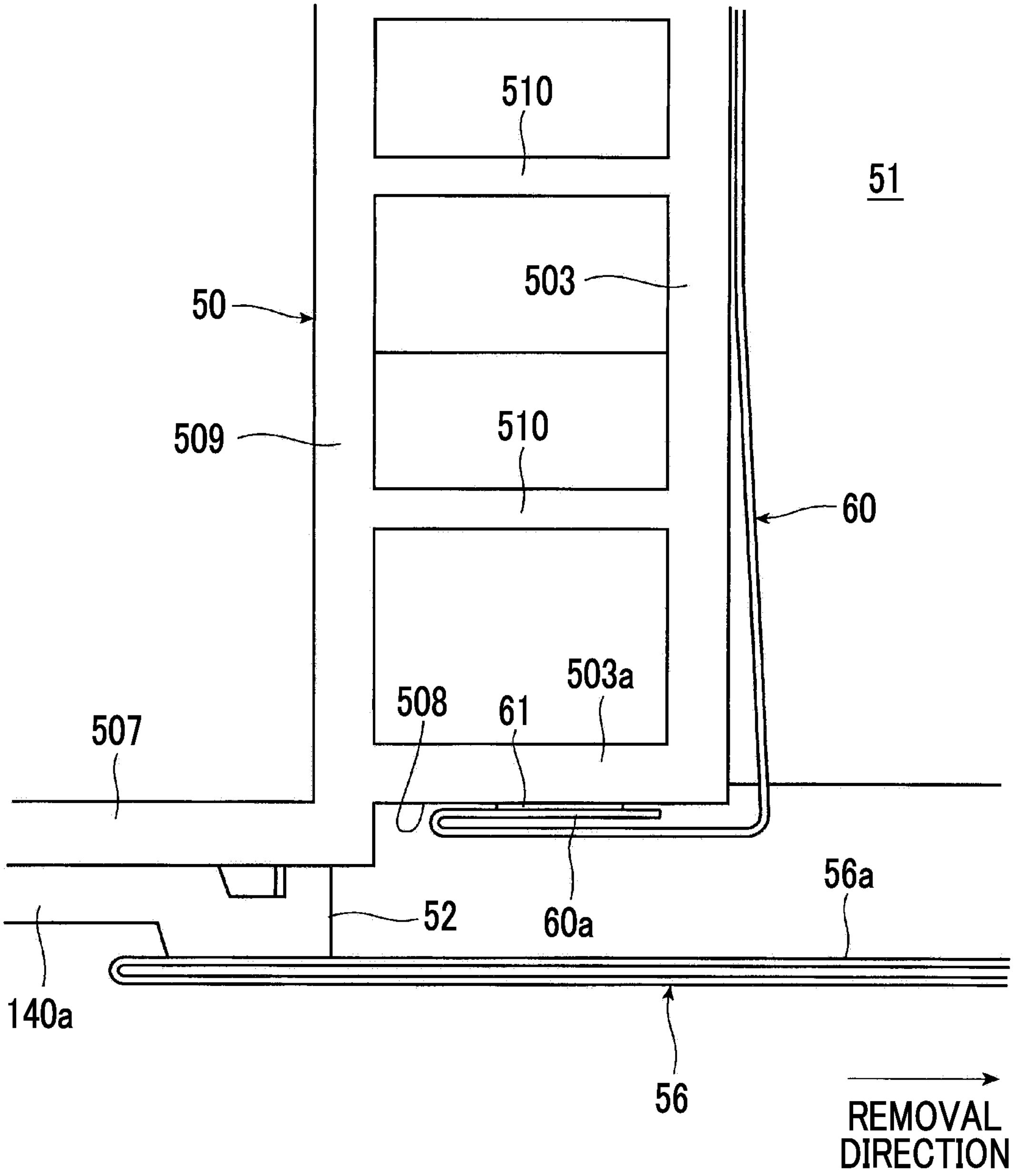
FIG. 9 is a cross-sectional configuration view showing major portions of the developer accommodating container.
Figure 10:
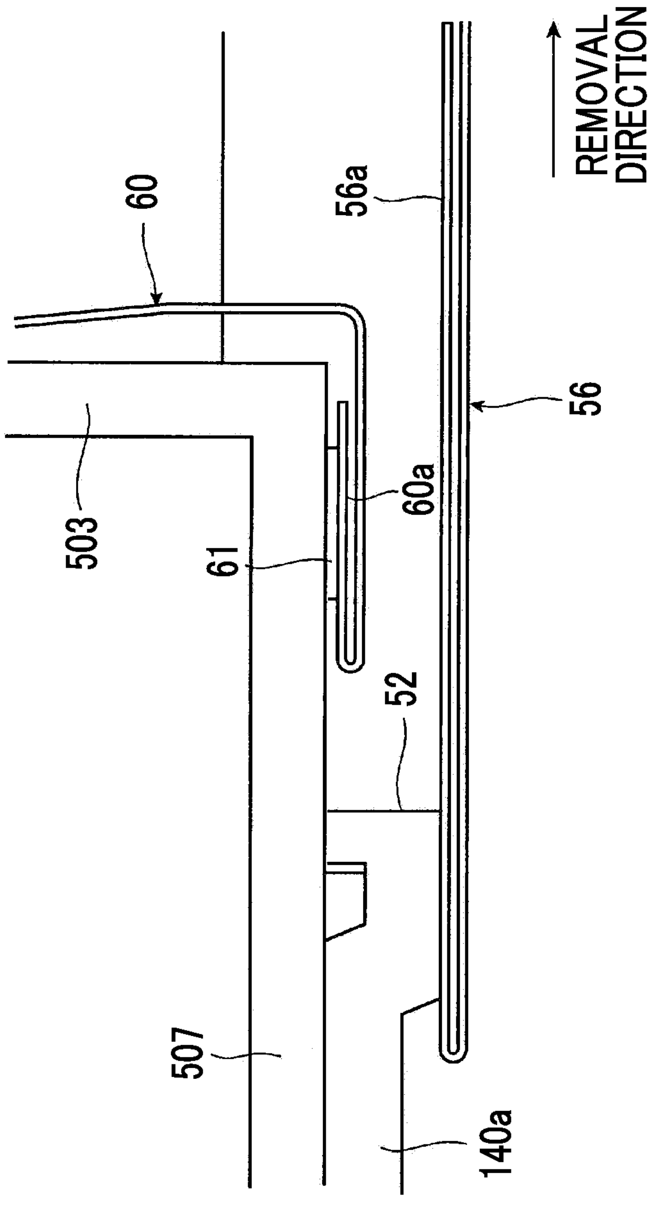
FIG. 10 is a cross-sectional configuration view showing major portions in a modification example of the developer accommodating container.

The breaking tape 60 is formed in, for example, an elongated tape shape consisting of Mylar film having a required width W and thickness of approximately 3 mm. As shown in FIG. 9, a tip 60*a* of the breaking tape 60 is temporarily fixed at a position corresponding (facing) to the supply port 52 positioned at the end portion on the opposite side to the removal direction of the sealing tape 56. The tip 60*a* of the breaking tape 60 is temporarily fixed by being bonded via a two-sided tape 61 in a state being folded back 180 degrees at a bottom surface portion 508 formed one step higher than the flange portion 507 of the developer accommodating container 50. In the developer accommodating container 50, a lower end portion 503*a* of the front wall 503 is bent outward at a position higher than the flange portion 507 in order to form the bottom surface portion 508. The developer accommodating container 50 has a front end wall 509 arranged parallel to the front wall 503 on a drive portion side of the front wall 503. The front wall 503 and the front end wall 509 of the developer accommodating container 50 are connected to each other by a plurality of connecting plates 510 which are arranged to be inclined. Without being limited to a configuration where the bottom surface portion 508 formed one step higher than the flange portion 507 is provided, as shown in FIG. 10, the flange portion 507 may be provided to close an end portion of the supply port 52 and be configured to temporarily fix the tip 60*a* of the breaking tape 60 to the bottom surface of the flange portion 507 by the two-sided tape 61. The breaking tape 60 is mounted at a predetermined position inside the developer accommodating container 50 in a step before the sealing tape 56 closes the supply port 52.

Figure 11:
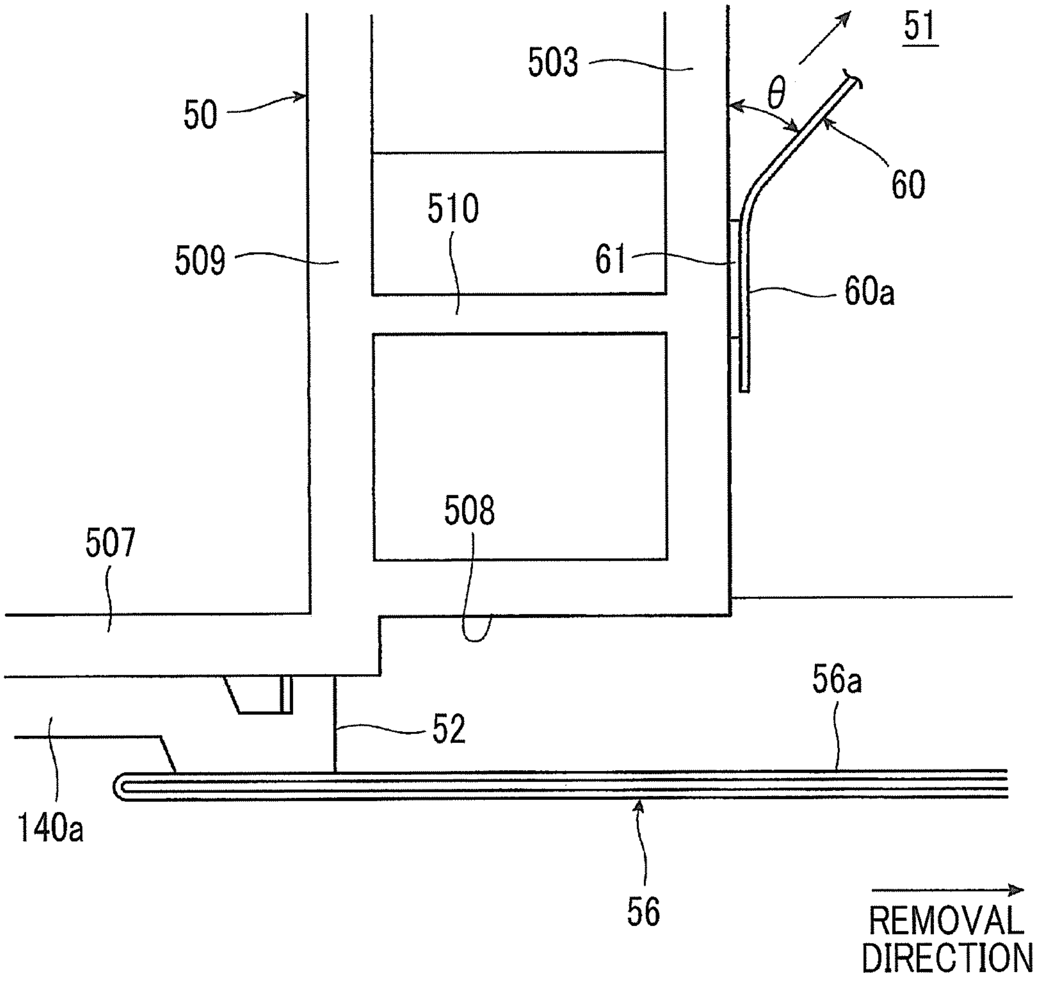
FIG. 11 (Prior art)
FIG. 11 is a cross-sectional configuration view showing major portions in a comparative example of the developer accommodating container.

By bonding the breaking tape 60 to the bottom surface portion 508 of the developer accommodating container 50 via the two-sided tape 61 in a state where the tip 60*a* is folded back 180 degrees, a force required for peeling the tip 60*a* of the breaking tape 60 is set to be relatively large. As shown in FIG. 11, for example, in a case where the tip 60*a* of the breaking tape 60 is temporarily fixed by being bonded to an inner surface of the front wall 503 of the developer accommodating container 50, which is separated from the supply port 52, a peeling angle θ of the breaking tape 60 in a case of extracting the breaking tape 60 is an acute angle smaller than 90 degrees. Thus, a force required for peeling the tip 60*a* of the breaking tape 60 is relatively small, and the tip 60*a* of the breaking tape 60 is easily peeled from an inner surface of the developer accommodating container 50, which is not desirable.

Figure 12:
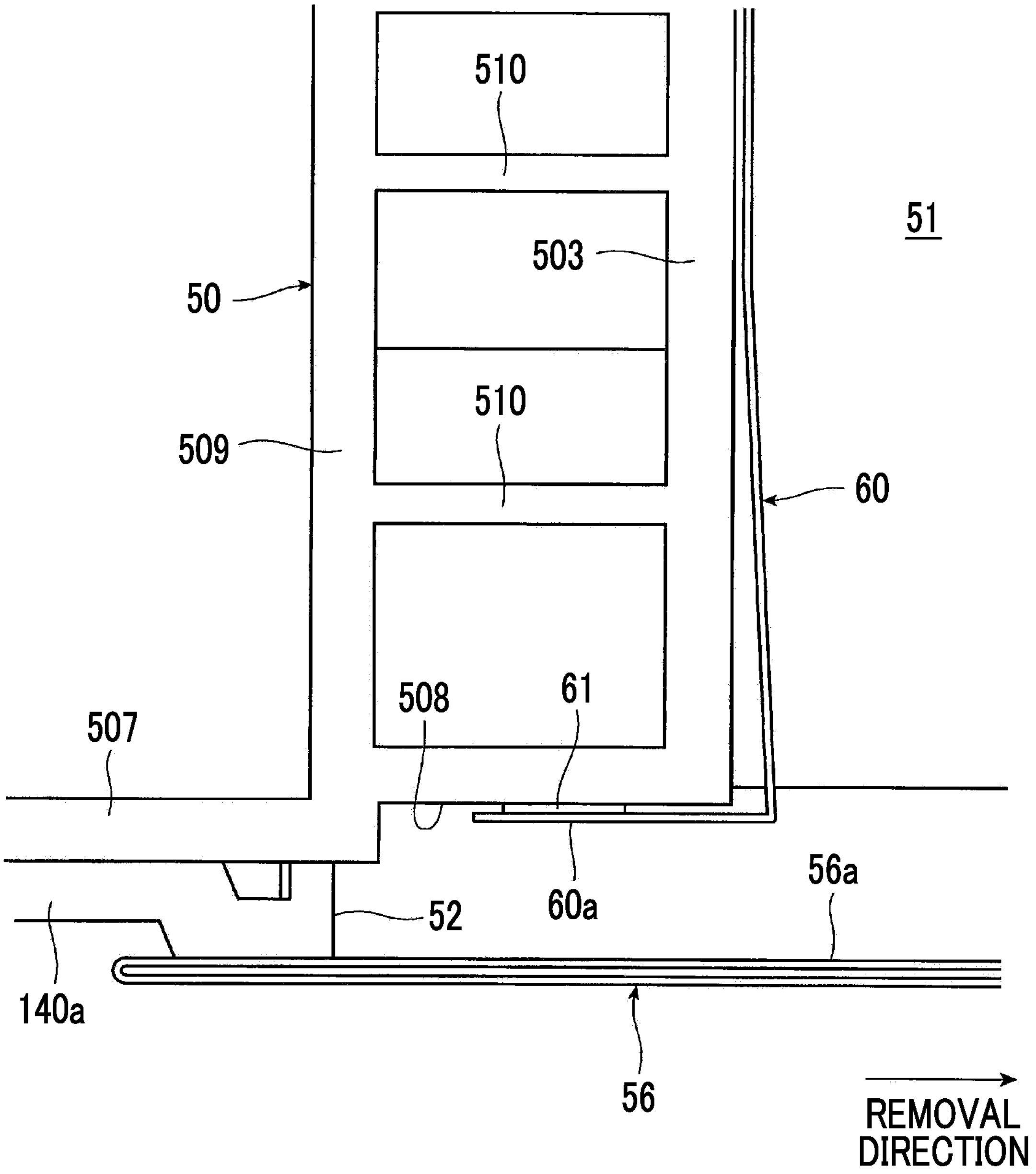
FIG. 12 is a cross-sectional configuration view showing major portions in a modification example of the developer accommodating container.

In addition, as shown in FIG. 12, in a case where the tip 60*a* of the breaking tape 60 is bonded to the bottom surface portion 508 of the developer accommodating container 50 via the two-sided tape 61 without being folded back 180 degrees in order to relatively increase the force required for peeling the tip 60*a* of the breaking tape 60, an angle formed by a direction in which a peeling force of peeling the tip 60*a* of the breaking tape 60 acts and a surface temporarily fixed by the two-sided tape 61 is 0 degree, and the force required for peeling the tip 60*a* of the breaking tape 60 may become excessive, which is not desirable.

As shown in FIG. 8, a tip portion 60*b* of the breaking tape 60 is bent from the tip 60*a* bonded to the bottom surface portion 508 of the developer accommodating container 50 to form an angle of substantially 90 degrees along the inner surface of the front wall 503 of the developer accommodating container 50 and is arranged upward along the inner surface of the front wall 503 of the developer accommodating container 50. In addition, the tip portion 60*b* of the breaking tape 60 is temporarily fixed to the upper end portion of the front wall 503 of the developer accommodating container 50 via a two-sided tape 62.

In addition, as shown in FIG. 8, an intermediate portion 60*c* of the breaking tape 60 is arranged over the back wall 504 along the ceiling wall 505 from the front wall 503 of the developer accommodating container 50. The intermediate portion 60*c* of the breaking tape 60 is temporarily fixed to a tip (an end portion on the non-driving side) of the ceiling wall 505 of the developer accommodating container 50 via a two-sided tape 63.

Further, a rear end portion 60*d* of the breaking tape 60, which is positioned inside the developer accommodating container 50, is arranged to form an acute angle smaller than 90 degrees from the ceiling wall 505 toward the back wall 504 of the developer accommodating container 50 and to be separated away from the back wall 504.

As described above, the reason why the rear end portion 60*d* of the breaking tape 60 is arranged to form an acute angle smaller than 90 degrees from the ceiling wall 505 toward the back wall 504 and to be separated away from the back wall 504 is to avoid a hindrance caused in a case where the breaking tape 60 closes a part of the filling port 53 and the starter developer 4S fills from the filling port 53.

In addition, the rear end portion 60*d* of the breaking tape 60 is not arranged along the back wall 504 in which the filling port 53 is formed inside the developer accommodating container 50, and it is difficult to fulfill a breaking effect of the starter developer 4S caused by the breaking tape 60.

For this reason, as described above, the foam 55 made of a synthetic resin, which is an example of the aggregation suppressing means, is arranged at the inner surface of the sealing member 54 corresponding to the filling port 53. By arranging the foam 55 made of a synthetic resin at the inner surface of the sealing member 54 corresponding to the filling port 53, even in a case where the starter developer 4S accommodated in the developer accommodating container 50 abuts against the inner surface of the sealing member 54 due to vibration, impact occurred in a case of abutment is absorbed since there is the foam 55 made of the synthetic resin, and the aggregation of the starter developer 4S caused by the vibration is suppressed.

The rear end portion 60*d* of the breaking tape 60, which is positioned inside the developer accommodating container 50, configures an extracting portion 60*e* by being bent at the lower end portion of the back wall 504 toward the back wall 504 and being extracted to the outside of the developer accommodating container 50 via a pulling portion 64 provided at the lower end portion of the back wall 504.

Figure 13:
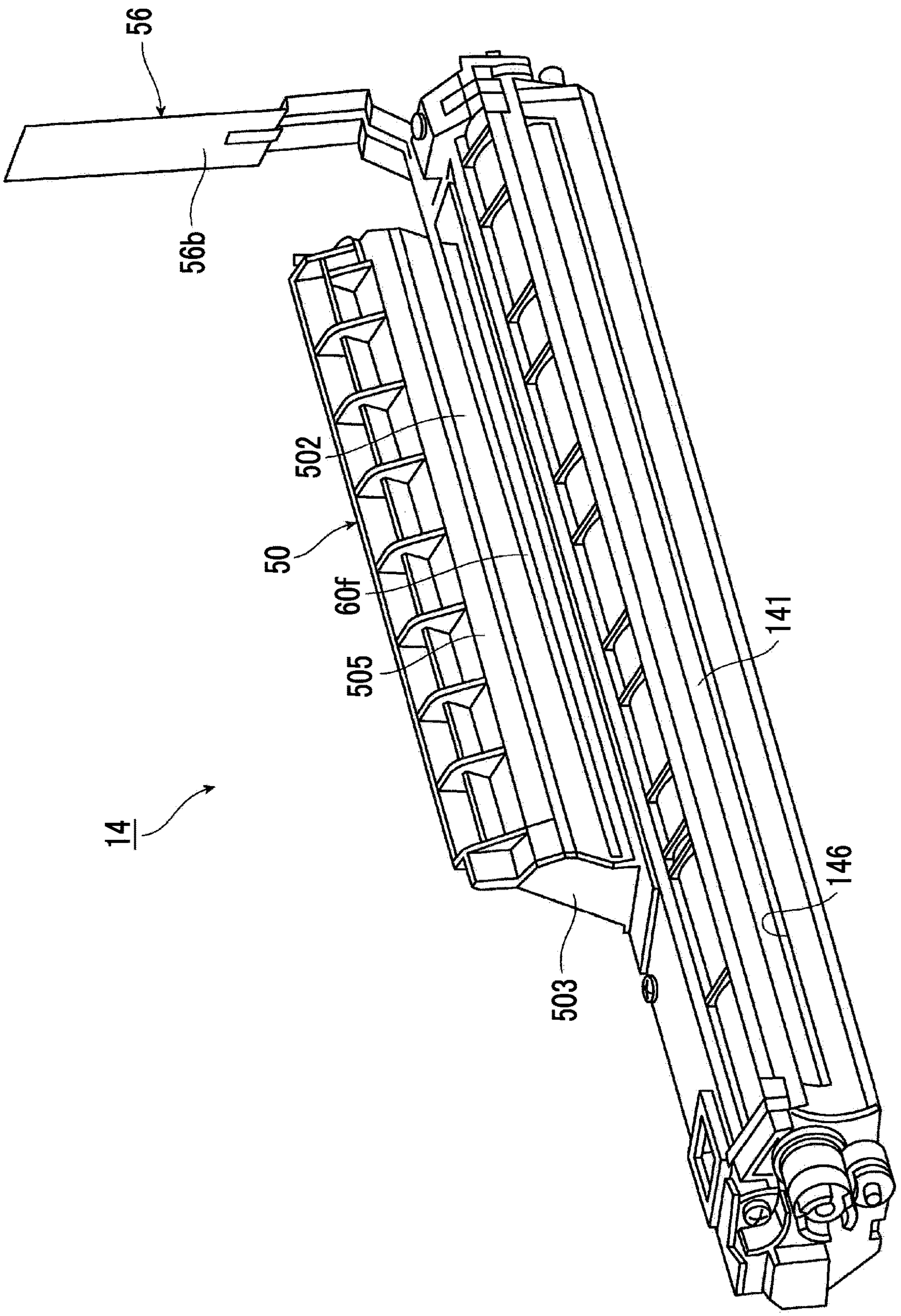
FIG. 13 is a perspective configuration view showing a developing device.

The extracting portion 60*e* of the breaking tape 60, which is pulled to the outside of the developer accommodating container 50, is no directly connected and fixed to the sealing tape 56 and has, as shown in FIG. 13, an extension portion 60*f* by being pulled to the outside of the developer accommodating container 50 and then being extended, along the right side wall 502 of the developer accommodating container 50, to the end portion of the developer accommodating container 50 along the longitudinal direction. The extension portion 60*f* of the breaking tape 60 is folded back at an end portion along the right side wall 502 of the developer accommodating container 50 and is connected and fixed to the sealing tape 56 by a two-sided tape (not shown).

The extension portion 60*f* of the breaking tape 60 is set to have a length corresponding to a length to a portion where the sealing tape portion 56*a* of the sealing tape 56 and the end portion of the extracting portion 60*e* of the breaking tape 60 are connected and fixed to the pulling tape portion 56*b* of the sealing tape 56.

To describe further, by being connected and fixed to the pulling tape portion 56*b* of the sealing tape 56, the breaking tape 60 is extracted from the developing device 14 with an extraction operation of the sealing tape 56. The breaking tape 60 has the extension portion 60*f* set to have the length corresponding to the length to the portion where the sealing tape portion 56*a* of the sealing tape 56 and the end portion of the extracting portion 60*e* of the breaking tape 60 are connected and fixed to the pulling tape portion 56*b* of the sealing tape 56. For this reason, the breaking tape 60 is configured such that an extraction operation of the breaking tape 60 arranged inside the developer accommodating container starts after the sealing tape 56 is extracted and the pulling tape portion 56*b* and the sealing tape portion 56*a* of the sealing tape 56 are extracted from the developing device 14.

With this configuration, it is possible to disperse and reduce an extraction force of extracting the sealing tape 56 together with the breaking tape 60.

The breaking tape 60 does not necessarily have to be extracted together with the sealing tape 56 and may be configured such that an end portion of the breaking tape 60 is not connected and fixed to the sealing tape 56 and the breaking tape 60 is individually and independently extracted after extracting the sealing tape 56.

Figure 14:
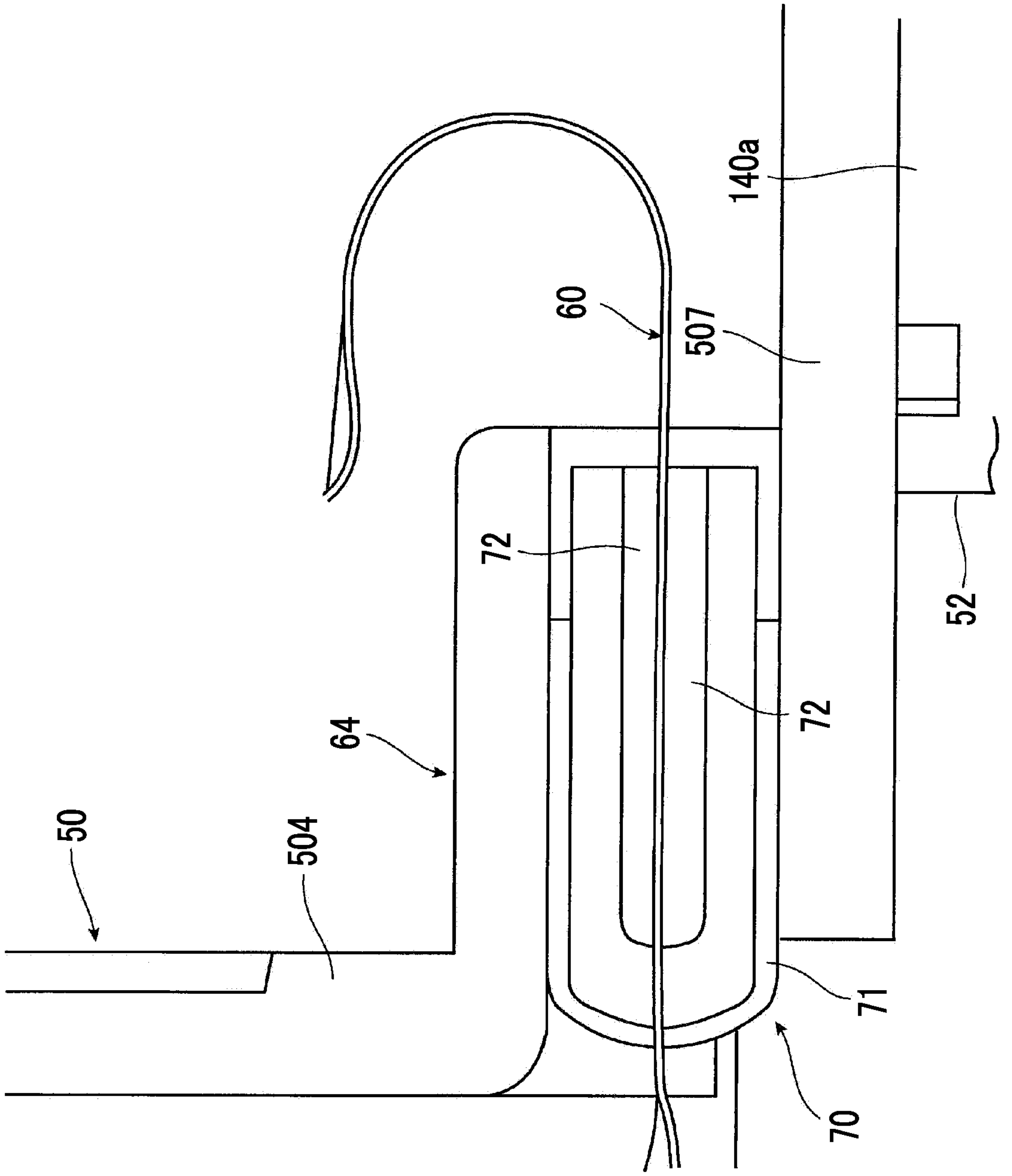
FIG. 14 is a cross-sectional configuration view showing major portions of the developer accommodating container.
Figure 15:
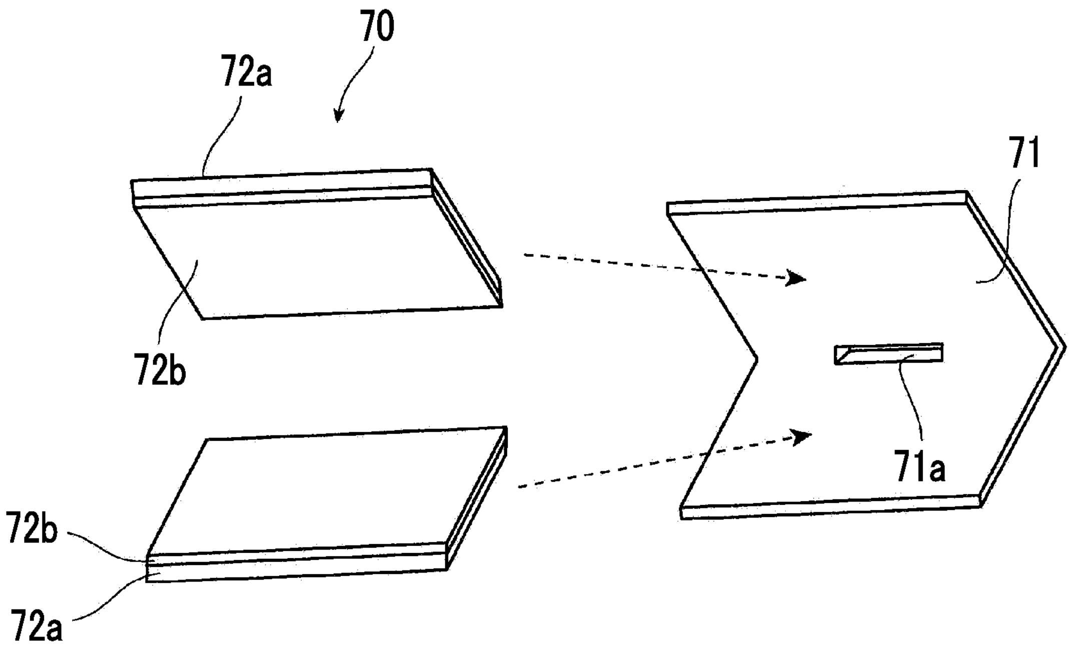
FIG. 15 is a configuration view showing a spill seal.

In addition, the pulling portion 64 of the developer accommodating container 50 is provided with a spill seal 70 that is an example of a wiping member which wipes off the starter developer 4S attached to the breaking tape 60. As shown in FIGS. 14 and 15, the spill seal 70 has a thin film-shaped seal substrate 71. The seal substrate 71 is configured in a thin film shape in a bent state in a U-shape in a state where the spill seal 70 is mounted on the pulling portion 64, and a guide port 71*a* which is an example of a breaking guide port is formed in a center portion of the seal substrate 71. The seal substrate 71 is preferably made of, for example, a resin material that is elastically deformable and has a low coefficient of friction on an outer surface such that the seal substrate can be smoothly mounted in a case of mounting on the pulling portion 64, and is possible to be configured by, for example, polyethylene terephthalate, which is so-called PET resin.

On both sides of the guide port 71*a*, a pair of contact member bodies 72 are supported by an inner surface of the seal substrate 71. The contact member body 72, which is an example of a pressure applying portion, has a cushion portion 72*a* configured by urethane, which is an example of an elastic material supported by the seal substrate 71. A cleaner portion 72*b* which is an example of a cleaning portion configured by felt, which is an example of cloth, is supported by the surface of the cushion portion 72*a*. In the contact member body 72, a total thickness of a pair of the cushion portion 72*a* and the cleaner portion 72*b* is set to be larger than the width of the pulling portion 64. That is, in a case where the spill seal 70 is mounted on the pulling portion 64, a state where generally the cushion portion 72*a* elastically deforms and the cleaner portions 72*b* are in contact with each other at a contact pressure set in advance is set to be held. Therefore, in a case where a state in which the cleaner portions 72*b* are in close contact with each other is held, the pulling portion 64 is closed by the spill seal 70, and leakage of the developer 4S from the developer accommodating container 50 is suppressed.

Action of Process Cartridge

In a case of using the process cartridge 300, after the process cartridge 300 is temporarily taken out from the apparatus body 1*a* of the image forming apparatus 1, a sealed state caused by the sealing tape 56 of the developing device 14 is released once the developing device 14 is brought into a usable state, and it is necessary to put the starter developer 4S accommodated in the developer accommodating container 50 into the casing 140 of the developing device 14. In a case where the process cartridge 300 is prepared separately from the apparatus body 1*a* of the image forming apparatus 1, the process cartridge is mounted inside the apparatus body 1*a* of the image forming apparatus 1 after the sealed state caused by the sealing tape 56 of the developing device 14 is released in the process cartridge 300.

In this case, as shown in FIG. 7, the user may hold a tip portion of the pulling tape portion 56*b* of the sealing tape 56 overhanging to the outside of the cartridge body 301 of the process cartridge 300, and the pulling tape portion 56*b* may be extracted, for example, upward.

In this case, the pulling tape portion 56*b* of the sealing tape 56 is pulled toward a pulling port 152 and sequentially moves via a position of the fraying mechanism 153, and the sealing tape portion 56*a* is peeled off from the edge of the supply port 52 and moves, following the movement of the pulling tape portion 56*b*. In this state, a side of the sealing tape portion 56*a*, which is in contact with the starter developer 4S in the developer accommodating container 50, is exposed to the outside, but developer powder attached to the sealing tape portion 56*a* is frayed in a case of passing through the fraying mechanism 153, and the developer powder is not extracted while being attached to the sealing tape portion 56*a* of the sealing tape 56.

In addition, in the present example, since the position of the sealing tape 56 in the width direction is regulated by the regulating wall 153*a* of the fraying mechanism 153, the sealing tape 56 is not extracted without passing through the fraying mechanism 153 as the pulling tape portion 56*b* and the sealing tape portion 56*a* of the sealing tape 56 always pass through the fraying mechanism 153 in a case of an extraction operation of the sealing tape 56.

Figure 16A:
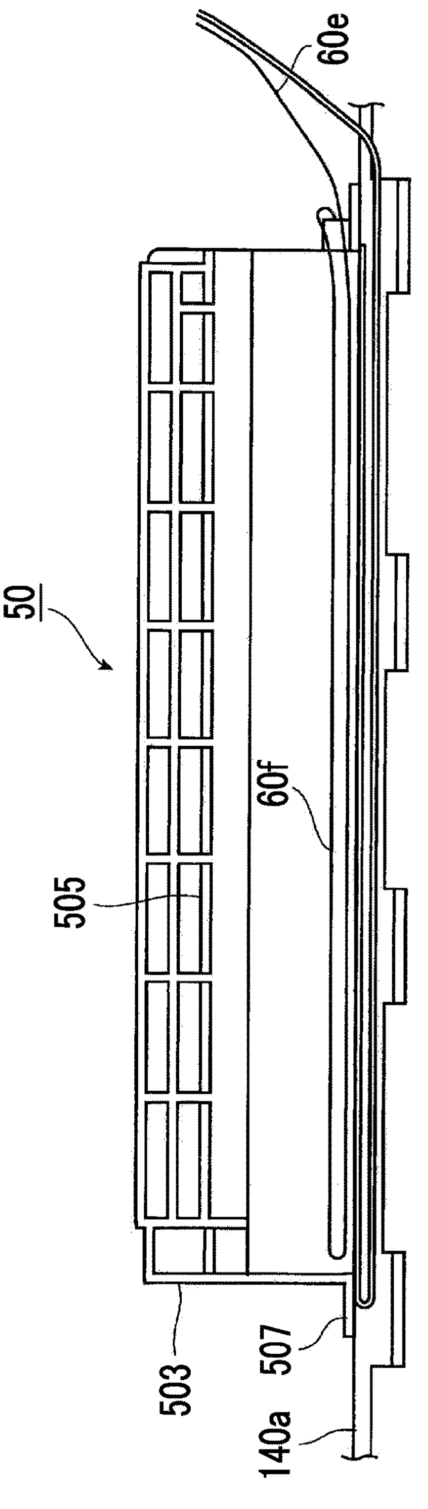
FIGS. 16A and 16B are configuration views showing action of the developer accommodating container.
Figure 16B:
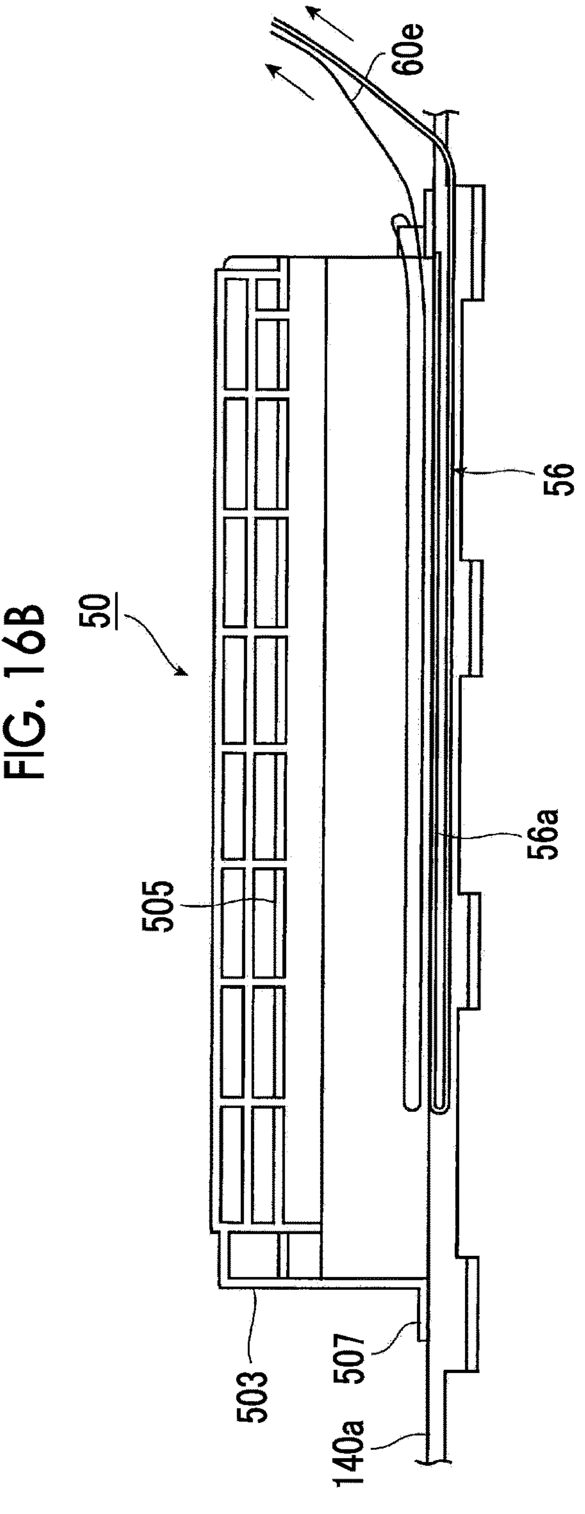

As shown in FIGS. 16A and 16B, the extension portion 60*f* of the breaking tape 60 is extracted together with the sealing tape 56 while the pulling tape portion 56*b* and the sealing tape portion 56*a* of the sealing tape 56 are extracted from the developing device 14. In a case where an extraction step of the pulling tape portion 56*b* and the sealing tape portion 56*a* of the sealing tape 56 ends, that is, in a case where the sealing tape portion 56*a* of the sealing tape 56 passes through the fraying mechanism 153, an extraction step of the breaking tape 60 from the developer accommodating container 50 starts.

Figure 17A:
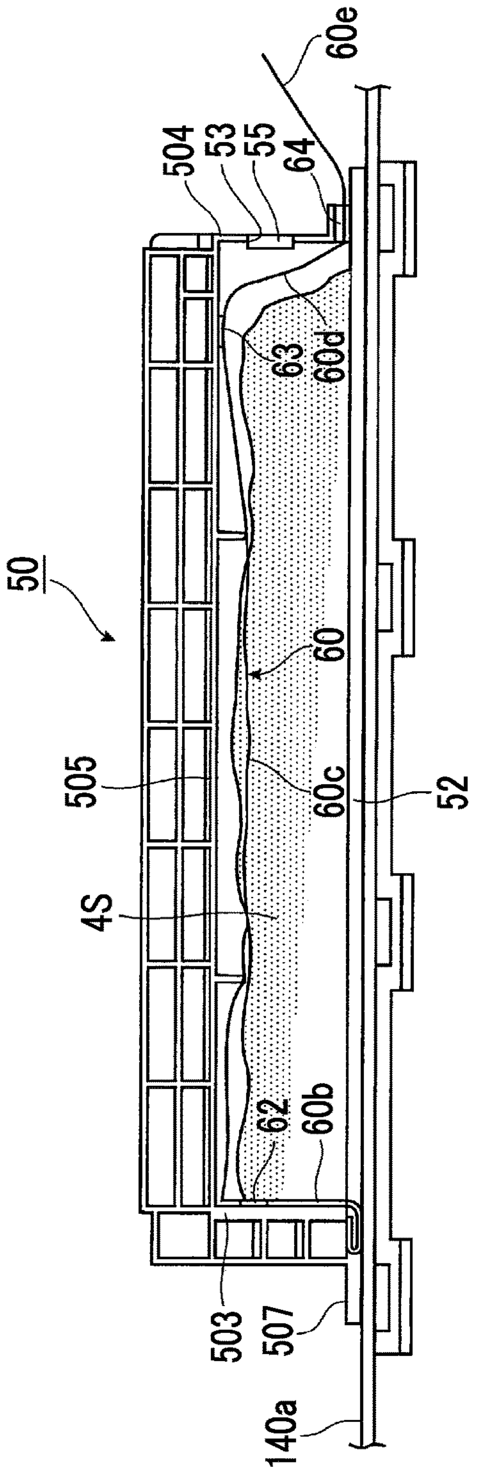
FIGS. 17A and 17B are cross-sectional configuration views showing action of the developer accommodating container.

As shown in FIG. 17A, in a case where the rear end portion 60*d* of the breaking tape 60, which is positioned inside the developer accommodating container 50, is extracted, the intermediate portion 60*c* bonded to the ceiling wall 505 of the developer accommodating container 50 via the two-sided tape 63 is peeled off from the ceiling wall 505 of the developer accommodating container 50 with the extraction of the rear end portion 60*d*, and the developer 4S accommodated inside the developer accommodating container 50 breaks from an upper right portion.

Figure 17B:
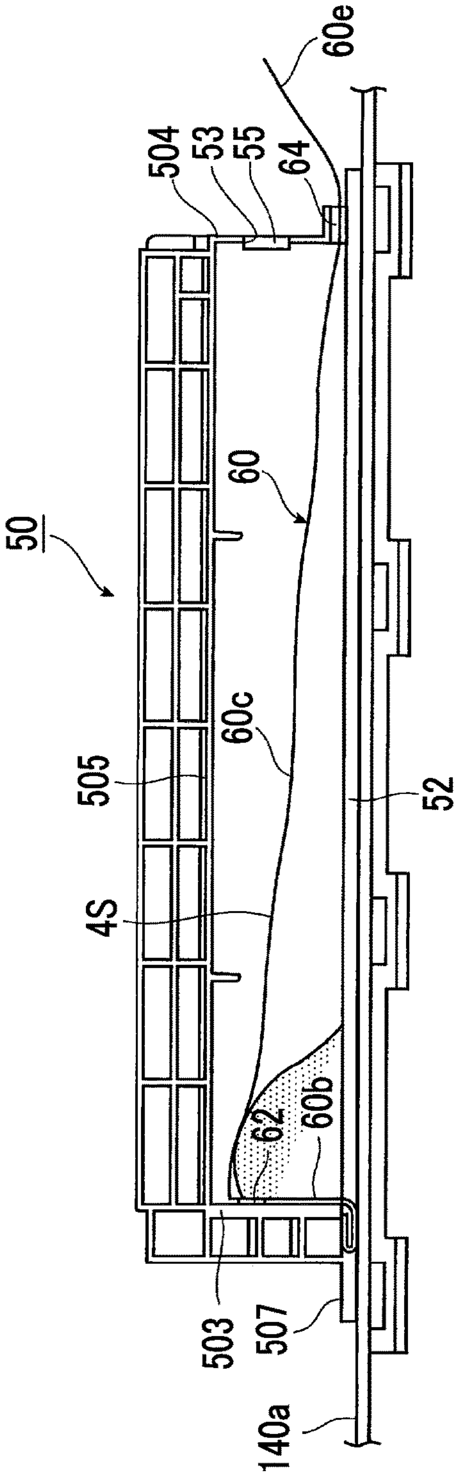

Further, as shown in FIG. 17B, in a case where the breaking tape 60 is extracted together with the sealing tape 56, the starter developer 4S accommodated in an upper portion in the developer accommodating container 50 is brought into an almost broken state by the intermediate portion 60*c* of the breaking tape 60 from the upper right portion positioned inside the developer accommodating container 50.

As shown in FIG. 17B, in a case where the rear end portion 60*d* and the intermediate portion 60*c* of the breaking tape 60, which are positioned inside the developer accommodating container 50, are extracted, the tip portion 60*b* bonded to an upper portion of the front wall 503 of the developer accommodating container 50 via the two-sided tape 62 is peeled off from the front wall 503 of the developer accommodating container 50 with the extraction of the rear end portion 60*d* and the intermediate portion 60*c*, and the starter developer 4S remaining on a front wall 503 side in the developer accommodating container 50 breaks.

Figure 18:
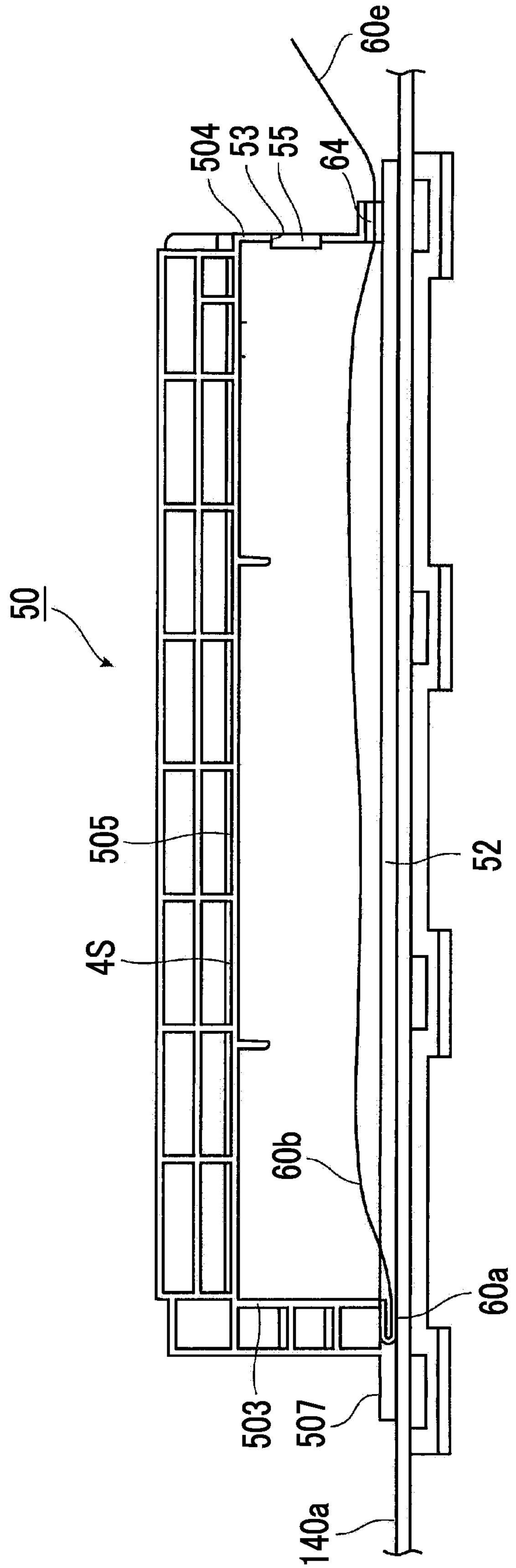
FIG. 18 is a cross-sectional configuration view showing action of the developer accommodating container.

Finally, as shown in FIG. 18, in a state where the tip portion 60*b* of the breaking tape 60 is arranged substantially parallel to the supply port 52 leaving the tip 60*a*, all breaking steps of the starter developer 4S accommodated inside the developer accommodating container 50 end.

Since the tip 60*a* of the breaking tape 60 is temporarily fixed to the inner surface of the developer accommodating container 50 with a relatively strong force compared to other portions, the tip remains until the end.

Then, as the breaking tape 60 is further extracted, the tip 60*a* temporarily fixed to the portion of the supply port 52 at which the tip 60*a* is positioned at the end portion of the developer accommodating container 50 on the opposite side to the removal direction of the sealing tape 56 is peeled and is extracted and removed from the inside of the developer accommodating container 50, and a breaking step of the starter developer 4S ends.

The vicinity of the breaking tape 60 pulled out from the developer accommodating container 50 is prevented from being contaminated by the starter developer 4S attached to the breaking tape 60 since the starter developer 4S attached to the breaking tape 60 is wiped off by the spill seal 70.

Although a case where a monochrome image forming apparatus is applied as an image forming apparatus has been described in the exemplary embodiment, without being limited thereto, it is evident that an image forming apparatus forming a full-color image including yellow, magenta, cyan, and black can also be applied as an image forming apparatus.

In addition, although a case where the developer accommodating container is applied as a powder accommodating container has been described in the exemplary embodiment, without being limited thereto, it is evident that a powder accommodating container that accommodates powder other than a developer can also be applied as a powder accommodating container.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder accommodating container comprising:
a powder accommodating portion that accommodates powder;
a sealing section that openably seals a supply port by being removed from the powder accommodating portion; and
a breaking section that has a film-shaped member that breaks the powder in the powder accommodating portion by being removed from the powder accommodating portion in a case of opening the supply port, is fixed to a plurality of places in the powder accommodating portion such that the film-shaped member is removable, and is fixed to the powder accommodating portion such that a force required for removing a tip of the film-shaped member from the powder accommodating portion is larger than other portions.

2. The powder accommodating container according to claim 1,
wherein the breaking section has a larger force of fixing the tip of the film-shaped member to be separated away from the powder accommodating portion in response to extraction than other portions.

3. The powder accommodating container according to claim 2,
wherein in the breaking section, an angle at which the temporarily fixed tip of the film-shaped member is peeled is set to 180 degrees.

4. A powder supply device comprising:
a powder accommodating container that accommodates powder; and
a transporting and supplying section that transports and supplies the powder supplied from the powder accommodating container,
wherein the powder accommodating container according to claim 3 is used as the powder accommodating container.

5. A developing device comprising:
a developer accommodating container that accommodates a developer;
a transporting section that transports and supplies the developer supplied from the developer accommodating container,
wherein the powder accommodating container according to claim 3 is used as the developer accommodating container.

6. A powder supply device comprising:
a powder accommodating container that accommodates powder; and
a transporting and supplying section that transports and supplies the powder supplied from the powder accommodating container,
wherein the powder accommodating container according to claim 2 is used as the powder accommodating container.

7. A developing device comprising:
a developer accommodating container that accommodates a developer;
a transporting section that transports and supplies the developer supplied from the developer accommodating container,
wherein the powder accommodating container according to claim 2 is used as the developer accommodating container.

8. The powder accommodating container according to claim 1,
wherein the breaking section is arranged inside the powder accommodating portion before the sealing section seals the supply port.

9. The powder accommodating container according to claim 8,
wherein the breaking section is arranged to pass through a region of the powder accommodating portion on an inner wall side which is an opposite side to the supply port.

10. A powder supply device comprising:
a powder accommodating container that accommodates powder; and
a transporting and supplying section that transports and supplies the powder supplied from the powder accommodating container,
wherein the powder accommodating container according to claim 9 is used as the powder accommodating container.

11. A powder supply device comprising:
a powder accommodating container that accommodates powder; and
a transporting and supplying section that transports and supplies the powder supplied from the powder accommodating container,
wherein the powder accommodating container according to claim 8 is used as the powder accommodating container.

12. The powder accommodating container according to claim 1,
wherein the powder accommodating portion is provided with, at a pulling port for pulling out the breaking section, a removing member that removes a developer attached to the breaking section.

13. The powder accommodating container according to claim 12,
wherein the breaking section starts a breaking operation of the developer after the sealing section ends an opening operation of the supply port.

14. The powder accommodating container according to claim 13, wherein the breaking section starts the breaking operation of the developer after one end of the breaking section is connected to the sealing section and the sealing section ends the opening operation of the supply port.

15. A powder supply device comprising:

a powder accommodating container that accommodates powder; and a transporting and supplying section that transports and supplies the powder supplied from the powder accommodating container, wherein the powder accommodating container according to claim 14 is used as the powder accommodating container.

16. A powder supply device comprising:

a powder accommodating container that accommodates powder; and a transporting and supplying section that transports and supplies the powder supplied from the powder accommodating container, wherein the powder accommodating container according to claim 13 is used as the powder accommodating container.

17. A powder supply device comprising:

a powder accommodating container that accommodates powder; and a transporting and supplying section that transports and supplies the powder supplied from the powder accommodating container, wherein the powder accommodating container according to claim 12 is used as the powder accommodating container.

18. A powder supply device comprising:

a powder accommodating container that accommodates powder; and a transporting and supplying section that transports and supplies the powder supplied from the powder accommodating container, wherein the powder accommodating container according to claim 1 is used as the powder accommodating container.

19. A developing device comprising:

a developer accommodating container that accommodates a developer;

a transporting section that transports and supplies the developer supplied from the developer accommodating container, wherein the powder accommodating container according to claim 1 is used as the developer accommodating container.

20. An image forming apparatus comprising:

an image holding section that holds an image; and a developing section that develops the image held by the image holding section, wherein the developing device according to claim 19 is used as the developing section.

* * * * *